United States Patent
Hoare et al.

(10) Patent No.: US 10,201,790 B2
(45) Date of Patent: Feb. 12, 2019

(54) BLENDER FOR FOOD AND BEVERAGES

(71) Applicant: Breville Pty Limited, Alexandria, NSW (AU)

(72) Inventors: Richard Hoare, Lane Cove (AU); Khon Thai, Campsie (AU); Lochana Subasekara Widanagamage Don, Caringbah (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 260 days.

(21) Appl. No.: 15/100,983

(22) PCT Filed: Dec. 4, 2014

(86) PCT No.: PCT/AU2014/001103
§ 371 (c)(1),
(2) Date: Jun. 2, 2016

(87) PCT Pub. No.: WO2015/081381
PCT Pub. Date: Jun. 11, 2015

(65) Prior Publication Data
US 2016/0296899 A1 Oct. 13, 2016

(30) Foreign Application Priority Data
Dec. 4, 2013 (AU) .................................. 2013904708

(51) Int. Cl.
*B01F 15/00* (2006.01)
*B01F 7/16* (2006.01)
(Continued)

(52) U.S. Cl.
CPC ....... *B01F 15/00409* (2013.01); *A47J 43/042* (2013.01); *A47J 43/046* (2013.01);
(Continued)

(58) Field of Classification Search
CPC .... A47J 43/042; A47J 43/046; A47J 43/0716; B01F 15/00253; B01F 15/00311; B01F 15/00389; B01F 15/00409; B01F 7/162
See application file for complete search history.

(56) References Cited

U.S. PATENT DOCUMENTS 3,951,351 A * 4/1976 Ernster ................. A47J 43/087
241/101.1
5,347,205 A * 9/1994 Piland ................... A47J 43/085
318/772
(Continued)

FOREIGN PATENT DOCUMENTS

| CN | 101460939 A | 6/2009 |
| CN | 101631606 A | 1/2010 |

OTHER PUBLICATIONS

Epacenet patent family listing of EP 3076836 (A1) Oct. 12, 2016, printed on Apr. 11, 2018, 1 page.*
(Continued)

*Primary Examiner* — Tony G Soohoo
(74) *Attorney, Agent, or Firm* — Marshall, Gerstein & Borun LLP

(57) ABSTRACT

A motorized kitchen apparatus including a processor module coupled to a non-volatile storage medium for storing a custom sequence; a user interface having a speed or power selection element and a record selector; a motor controller coupled to a blender motor, the processor module coupled to the motor controller for controlling operation of the motor according to user input selections. Upon user selection of the record selector, the processor module enters a record mode and records a sequence of user inputs made through the user interface; the sequence including data indicative of a power profile selected by the user over a period of time, and upon completion of the record mode, the processor module saves
(Continued)

a custom sequence indicative of the recorded sequence to the non-volatile storage medium for subsequent playback.

8 Claims, 40 Drawing Sheets

(51) Int. Cl.
    *A47J 43/07*           (2006.01)
    *A47J 43/042*         (2006.01)
    *A47J 43/046*         (2006.01)

(52) U.S. Cl.
    CPC ........... *A47J 43/0716* (2013.01); *B01F 7/162* (2013.01); *B01F 15/00253* (2013.01); *B01F 15/00311* (2013.01); *B01F 15/00389* (2013.01); *G05B 2219/34219* (2013.01); *G05B 2219/37347* (2013.01)

(56) References Cited

U.S. PATENT DOCUMENTS

| | | | | | |
|---|---|---|---|---|---|
| 5,380,086 | A | * | 1/1995 | Dickson | A21C 1/14 241/101.2 |
| 5,845,991 | A | * | 12/1998 | Sundquist | A47J 43/085 366/206 |
| 6,397,735 | B1 | * | 6/2002 | Wong | A47J 43/046 241/37.5 |
| 6,402,365 | B1 | * | 6/2002 | Wong | A47J 43/046 241/36 |
| 7,581,688 | B2 | * | 9/2009 | Mally | A47J 43/042 241/30 |
| 2002/0141286 | A1 | * | 10/2002 | Wulf | A47J 43/0727 366/206 |
| 2002/0176320 | A1 | * | 11/2002 | Wulf | A47J 43/042 366/205 |
| 2006/0136191 | A1 | * | 6/2006 | Irons | G06F 9/45512 703/24 |
| 2008/0223963 | A1 | * | 9/2008 | Mally | A47J 43/042 241/25 |
| 2008/0225636 | A1 | * | 9/2008 | Kolar | A47J 43/07 366/206 |
| 2009/0097351 | A1 | | 4/2009 | Li | |
| 2011/0149677 | A1 | * | 6/2011 | Davis | A47J 43/042 366/205 |
| 2013/0214716 | A1 | * | 8/2013 | Barfus | A47J 43/08 318/434 |
| 2013/0343150 | A1 | * | 12/2013 | Farrell | A47J 43/082 366/344 |
| 2015/0069157 | A1 | * | 3/2015 | Wulf | A47J 43/06 241/46.17 |
| 2016/0256008 | A1 | * | 9/2016 | Dickson, Jr. | B01F 13/045 |
| 2016/0256839 | A1 | * | 9/2016 | Dickson, Jr. | B01F 15/00305 |
| 2016/0296899 | A1 | * | 10/2016 | Hoare | A47J 43/046 |

OTHER PUBLICATIONS

Office Action issued in Chinese Patent Application No. 201480074856.1, dated Jun. 1, 2018, 11 pages.
International Search Report and Written Opinion for PCT/AU2014/001103, dated Jan. 29, 2015.
International Preliminary Report on Patentability for PCT/AU2014/001103, dated Jun. 7, 2016.
Extended European Search Report for European Patent Application No. 14868545.6, dated Sep. 7, 2017.

* cited by examiner

BLENDER FOR FOOD AND BEVERAGES

FIELD OF THE INVENTION

The invention pertains to motorised blenders and more particularly to a motorised food and beverage blender having a base and removable jug.

The invention has been developed primarily for use as a motorised food and beverage blender having a base and removable jug and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Food and beverage blenders are well known. A blender of this type generally comprises a base in which is located an electric motor. The base accepts a removable jug. Mechanical power is transmitted from the base to the jug with a mechanical coupling arrangement. Blades in the jug rotate for the purpose of blending, mixing or stirring foods or beverages.

The foods or beverages in the jug rise under the influence of the rotating blades. Particularly in high powered blenders, the force exerted by the rising foods or beverages may be enough to disrupt the jug's lid or defeat the lid's seal. Accordingly, a lid is required, that in cooperation with the jug, results in a secure sealing of the jug but also resulting in a lid that is relatively easy to install and remove.

For the jug's lid to have a transparent portion, a relatively hard, transparent polymer must be utilised in a viewing area. In order to create an effective seal between the lid and jug, softer polymer must be utilised for the seal. Accordingly, a lid with a transparent portion is required that combines both hard and soft polymers in an advantageous way.

Jug lids are also known that have a removable, central, cap. Removing the cap allows food or beverages to be introduced through the lid when it is in place. The cap can also serve as a measuring cup. When that part of the lid that retains the cap is a hard polymer and the cap is a hard polymer, motor induced vibrations can cause undesirable rattling or vibration of the cap. Accordingly, the mechanical interaction between the lid and the cap requires strategic use of soft polymers to reduce vibration and noise.

The user interface of a blender may include both push buttons and rotary knobs. However, particularly with a rotary knob, debris under and around the knob may be difficult to clean. Accordingly, a removable knob portion for a blender is required that facilitates removal and cleaning.

The mechanical coupling between the blender's motor and the female coupling normally associated with the base is normally a rigid connection. However, vibration and misalignment can be minimised by providing a torsionally resilient coupling between the motor and the base's coupling.

The execution of certain recipes, in a blender, may be enhanced by providing programming functionality. By programming a blender, a user can obtain a repetition of a sequence of blender events, later in time. This allows the user to easily and accurately reproduce a complex series of events on demand. It would be advantageous to provide a pause functionality to allow a user to temporarily pause the blender, during programming, to allow, for example, additional ingredients to be added during the course of a program or during the subsequent playback of the same program.

SUMMARY OF THE DISCLOSURE

According to an aspect of the invention, the invention may to overcome or ameliorate at least one of the disadvantages of the prior art, or to provide a useful alternative.

According to an aspect of the technology there is provided an apparatus including:
  a processor module, coupled to a non-volatile storage medium for storing a custom sequence;
  a user interface having a speed or power selection element and a record selector;
  a motor controller coupled to a blender motor, the processor module coupled to the motor controller for controlling operation of the motor according to user input selections;
  wherein upon user selection of the record selector, the processor module enters a record mode and records a sequence of user inputs made through the user interface; the sequence including data indicative of a speed or power profile selected by the user over a period of time, and upon completion of the record mode, the processor module saves a custom sequence indicative of the recorded sequence to the non-volatile storage medium for subsequent playback.

According to an aspect of the technology there is provided a method performed by a processor module for providing a custom record feature in an apparatus, the apparatus being coupled to a non-volatile storage medium for storing a custom sequence for later playback, the method comprising the steps of:
  (a) entering a record mode;
  (b) monitoring a user interface, and recording data indicative of the user inputs to form a recorded user input sequence;
  (c) monitoring completion of the record mode; and
  (d) saving a custom sequence to the non-volatile storage medium, the custom sequence being indicative of the recorded user input sequence.

According to an aspect of the technology there is provided a method performed by a processor module for authoring a custom sequence through providing a custom record feature in an apparatus, the apparatus being coupled to a non-volatile storage medium for storing the custom sequence for later playback, the method comprising the steps of:
  (a) entering a record mode;
  (b) monitoring a user interface, and recording data indicative of the user inputs to form a recorded user input sequence;
  (c) monitoring completion of the record mode; and
  (d) saving a custom sequence to the non-volatile storage medium, the custom sequence being indicative of the recorded user input sequence.

According to an aspect of the technology there is provided a method of authoring a custom sequence for operating an apparatus, the apparatus having a processor coupled to a non-volatile storage medium for storing the custom sequence for later playback, the method comprising the steps of:
  (a) selecting a record mode;
  (b) operating a user interface, wherein the processor records data indicative of the user inputs to form a recorded user input sequence;
  (c) completing the record mode, wherein the processor saves the custom sequence to the non-volatile storage medium, the custom sequence being indicative of the recorded user input sequence.

According to an aspect of the technology there is provided a method performed by a processor module for providing a custom record playback feature in an apparatus, the apparatus being coupled to a non-volatile storage medium that stores one or more custom sequence for playback, the method comprising the steps of:
(a) entering playback mode by user selection of a custom sequence;
(b) accessing the custom sequence from non-volatile memory;
(c) obtaining data indicative of the next step of the custom sequence, and commencing the next step;
(d) monitoring completion or termination of the custom sequence, and if not complete or terminated, return to step (c).

According to an aspect of the technology, the technology may provide a combination of jug and lid whereby the lid is mechanically retained by an underhanging lip.

According to an aspect of the technology, the technology may provide a blender lid having a central cap whereby soft polymer inserts moderate the contact between the harder polymers forming the cap and that part of the lid that retains it.

According to an aspect of the technology, the technology may provide an improved sealing arrangement between a polymer lid and a jug.

According to an aspect of the technology, the technology may provide a blender base having an interface with a rotating knob that is secured byway of magnetic attraction.

According to an aspect of the technology, the technology may provide in a preferred form a torsionally soft coupling between a blender's motor and the coupling that it drives.

According to an aspect of the technology, the technology may provide a blender having a processor, that processor providing, in cooperation with the user interface, programming functionality.

According to an aspect of the technology there is provided a motorised food and beverage blender apparatus, including a base and removable jug.

Preferably, the jug has a lid, wherein the lid is mechanically retained by an underhanging lip.

Preferably, the jug has a lid, wherein the lid has a central cap whereby soft polymer inserts moderate the contact between the harder polymers forming the cap and that part of the lid that retains it.

Preferably, the jug has a polymer lid, wherein an improved sealing arrangement is provided between the lid and the jug.

Preferably the base has an interface with a rotating knob that is secured by way of magnetic attraction.

Preferably, the apparatus includes a torsionally soft coupling between a blender's motor and the coupling that it drives.

Preferably the apparatus has a processor module, wherein the processor module cooperate with a user interface to provide programming functionality. More preferably, the programming functionality further comprises a pause mode. A resumption from the pause mode preferably requires a user action. Most preferably, the processor causes a gradual increase in the blender's speed during any resumption from a pause mode.

BRIEF DESCRIPTION OF THE DRAWING FIGURES

In order that the technology be better understood, reference is now made to the following drawing figures in which.

DETAILED DESCRIPTION

Figure 1A:
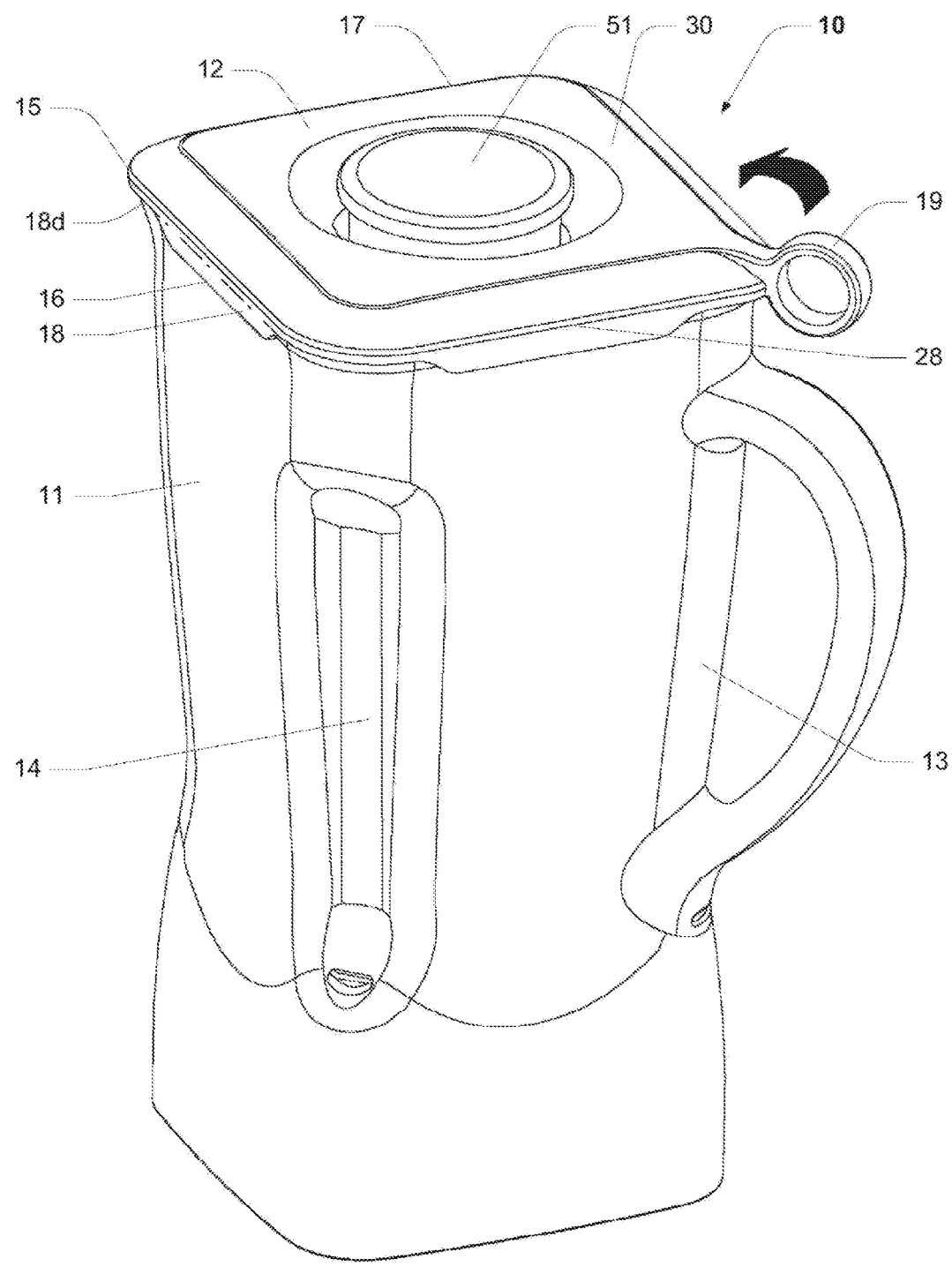
FIG. 1A is a perspective view of a blender jug with lid and lid cap.
Figure 1B:
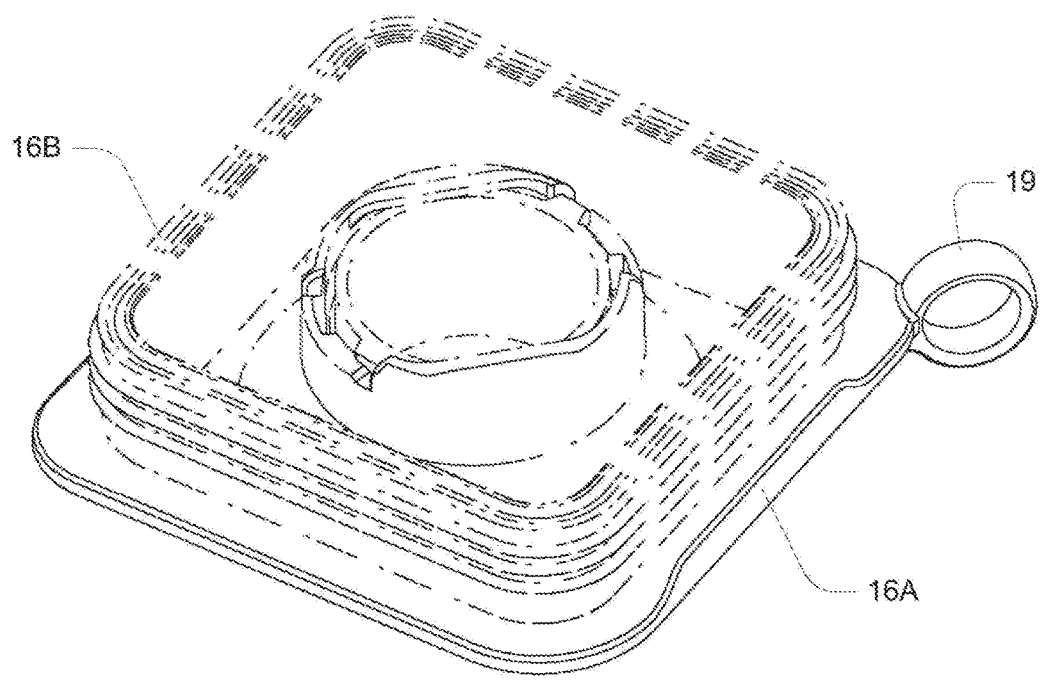
FIG. 1B is an inverted perspective view of a lid illustrating a pair of opposed lips.
Figure 1C:
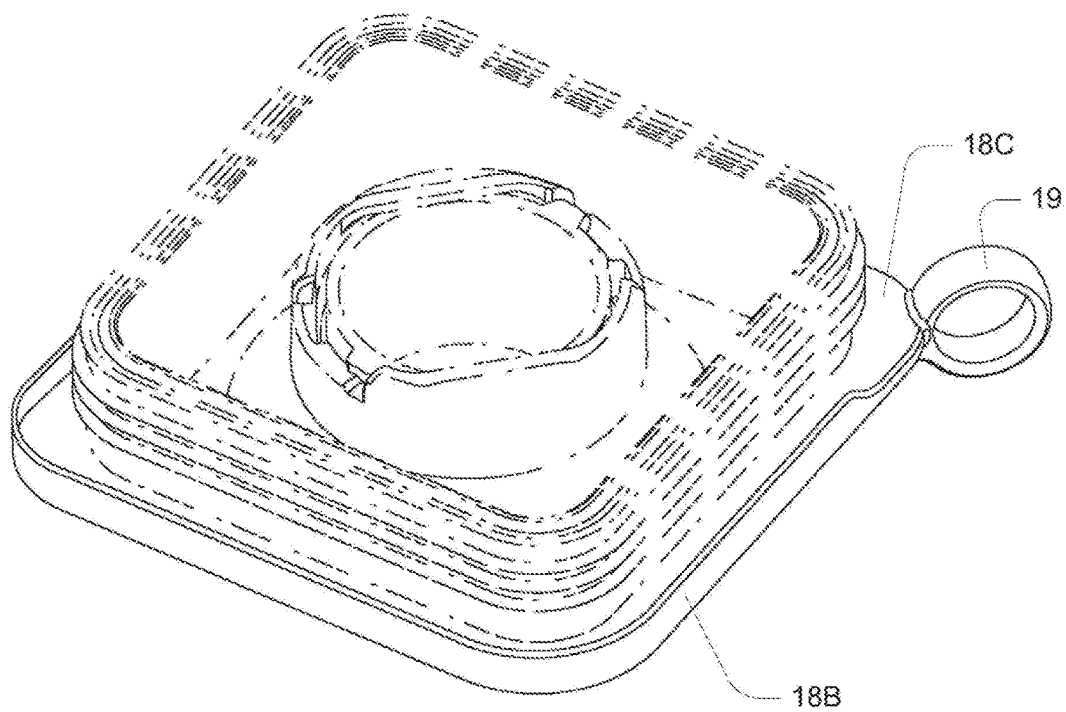
FIG. 1C is an inverted perspective view of a lid for a blender having a circumferential lip that is interrupted with a gap.

As shown in FIG. 1A, a blender jug to comprises a vessel 11 having a lid 12. In this example, the cross section of the jug 11 is approximately square, having rounded corners 13. Some corners may feature optional indentations 14 so as to form internal ribs or protrusions. In this example, the lid 12 is generally square, having rounded corners 15. As will be explained, the lid has internal sealing features that prevent the escape of ingredients from the interior of the vessel 11. To better mechanically stabilise the lid, one or more flexible external lips 16 are also provided. In this example, each side edge 17 of the lid has a single descending lip 18. The corners of the lid have no lip under them. As shown in FIG. 1B, the lip 18 may be provided in a single opposing pair 16a, 16b on opposite side edges of the lid 12, or, as illustrated in FIG. 1C, by having one continuous lip 18 associated with each of the four sides of the lid. In the example of FIG. 1C, the continuous lip 18b is interrupted in one corner of the lid 18C to accommodate the pouring spout 18d of the jug. It is preferred that the pull ring 19 be located on a corner of the lid 18c where the lip is not present. Removal of the lid is facilitated by the pull ring 19, preferably located adjacent to one of the corners 15 of the lid. In this example, the pull ring is located radially outward from one of the corners 15, the centre of the ring 19 being located approximately in the same plane as the outward most edge 28 of the lid 12.

Figure 2:
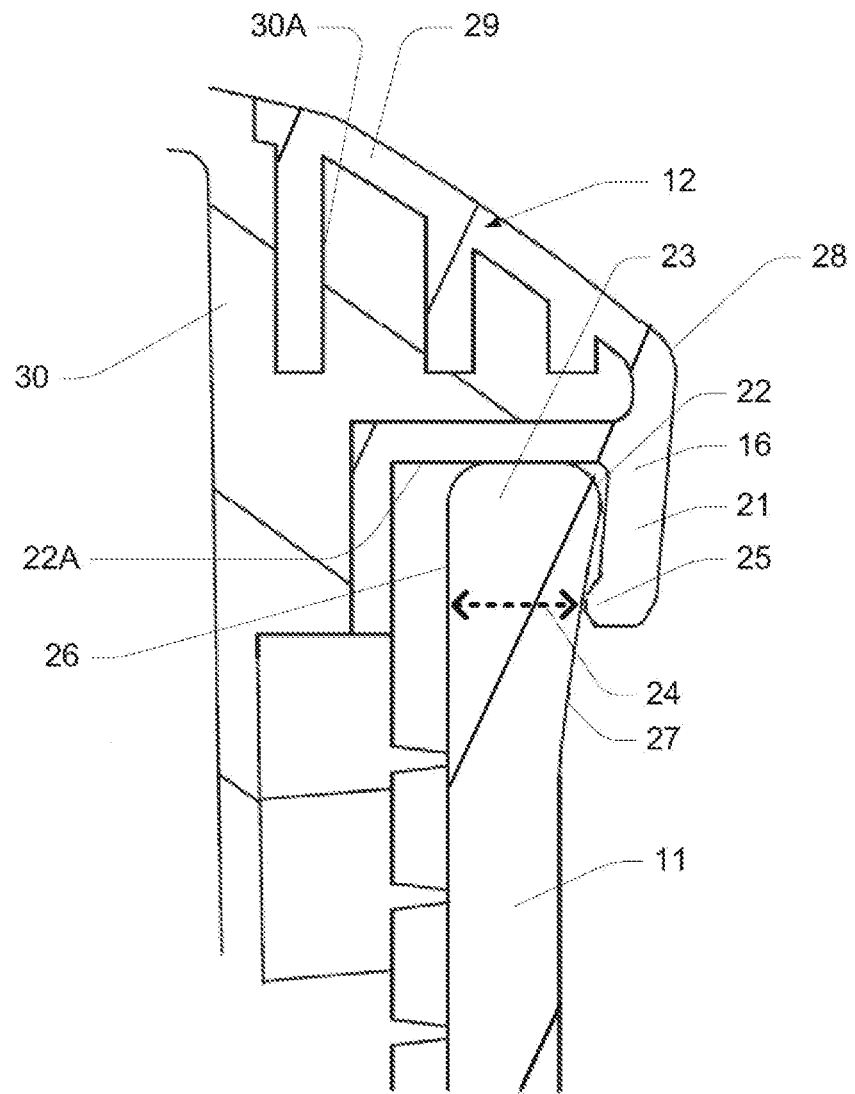
FIG. 2 is a cross sectional view of an upper rim of a jug and its cooperation with a lid made in accordance with the teachings of the present technology.

As shown in FIG. 2, the mechanical cooperation between the jug vessel 11 and the lid 12 maybe enhanced by providing the lid's lip or lips 16 with an underhanging or inwardly directed inclination 21. In this way, the lid provides a circumferential recess 22 for receiving the upper rim 23 of the jug 11. Because of the inward directed inclination, the width at the top of the circumferential recess 22 is wider then the width 24 at the bottom of the recess. The underhanging portion of the lip 21 may terminate in an inwardly directed bead 25. In preferred embodiments, the upper rim or edge 23 of the jug 11 is thicker than the portion of the jug's sidewall that lies below it. In this example, the inside wall 26 of the jug is flat and the outside wall 27 tapers radially outwardly to form the enlargement at the rim 23. This arrangement provides a mechanical interference between the lip 16 and the rim 23 when the lid is first placed onto the jug. The flexibility of the lip 16 allows the lip to flex and thus pass over the enlarged rim 23. When fully seated, the lip 16 will exert a gentle clamping force on the jug, particularly in the region of the optional bead 25 or lower edge of the lip.

In preferred embodiments, the circumferential recess 22 is formed in a soft polymeric overmoulded part 29 that cooperates with and overlies the rigid polymeric body 30 of the lid 12 and the pull ring. As illustrated in FIG. 2, the over moulding 29 that forms the inverted three sided recess 22 provides a landing or terminal surface 22a against which the upper rim 22 of the jug 11 rest when the lid is in place. The harder lid body has slots 30a for increasing the surface area and keying between the lid body 30 and the overmoulded part 29.

Figure 3:
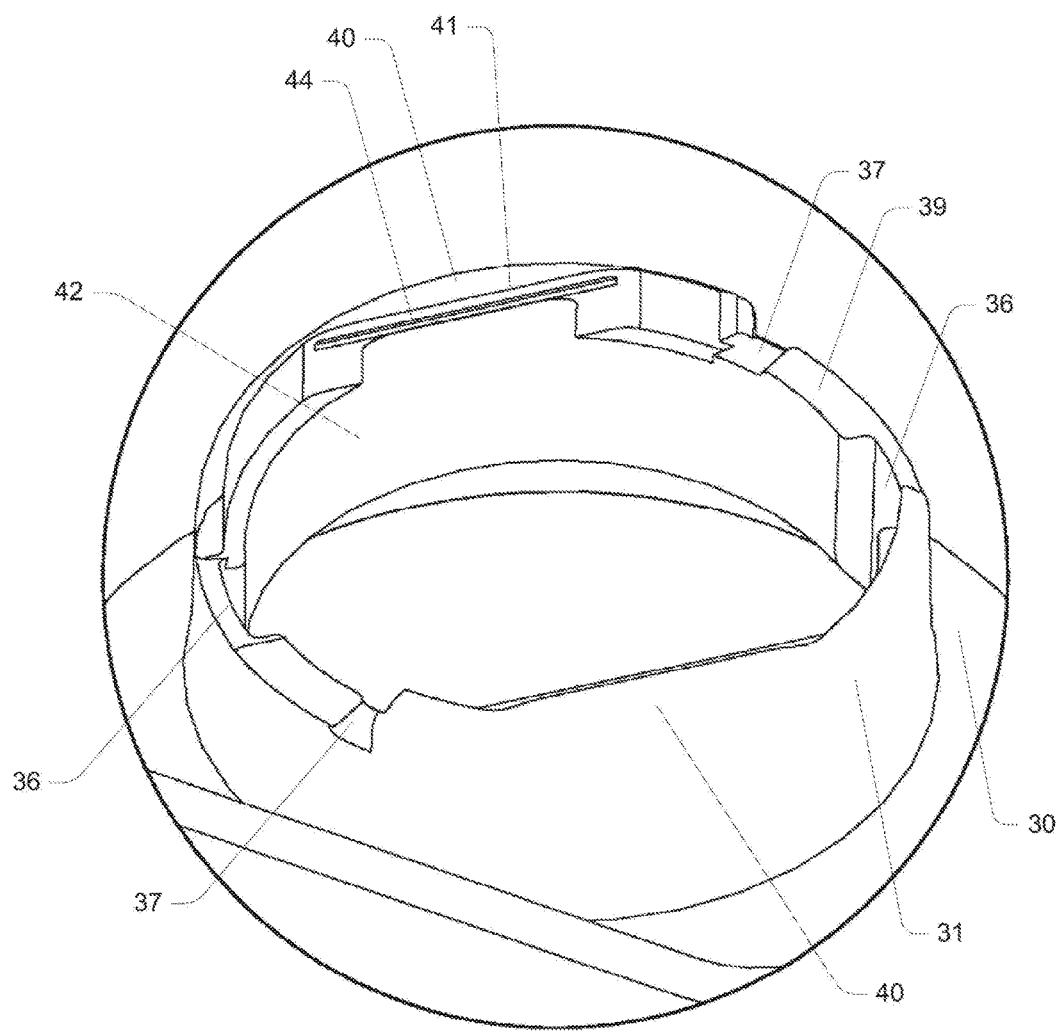
FIG. 3 is an inverted perspective view of the lid's collar.
Figure 3A:
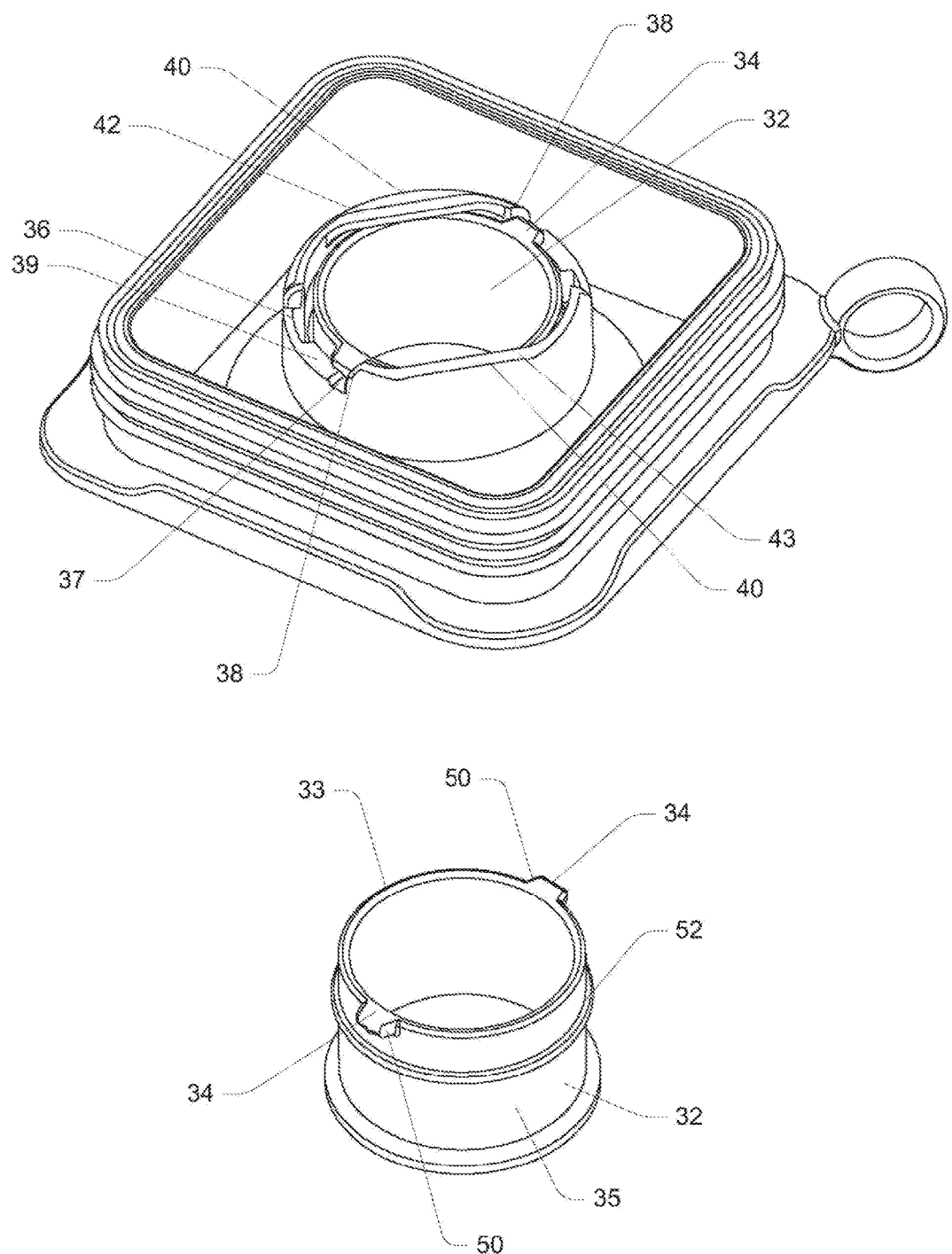
FIG. 3A is an inverted perspective view of a lid and lid cap.
Figure 4:
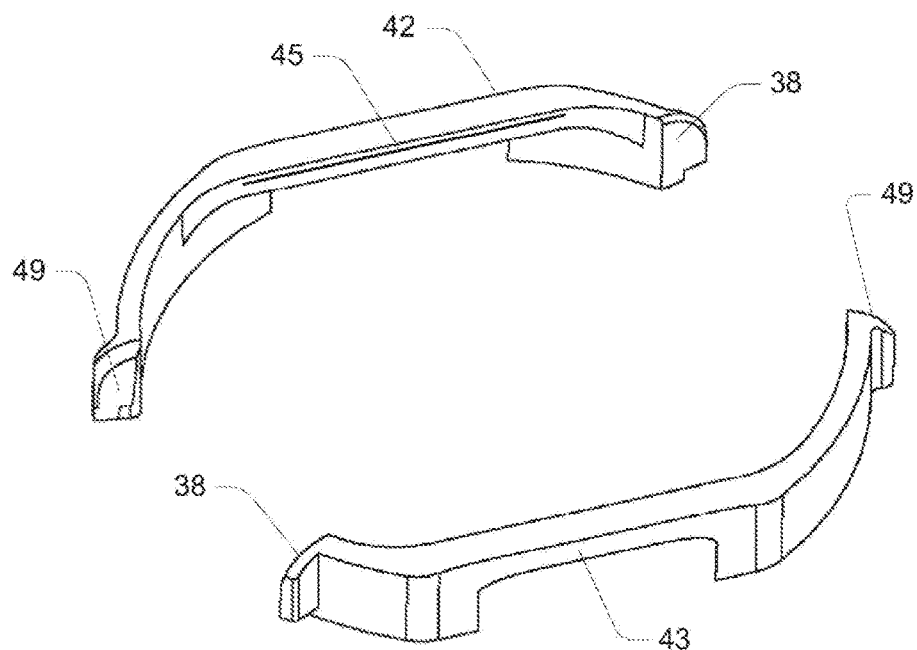
FIG. 4 is a perspective view of the polymeric inserts associated with the collar.
Figure 5:
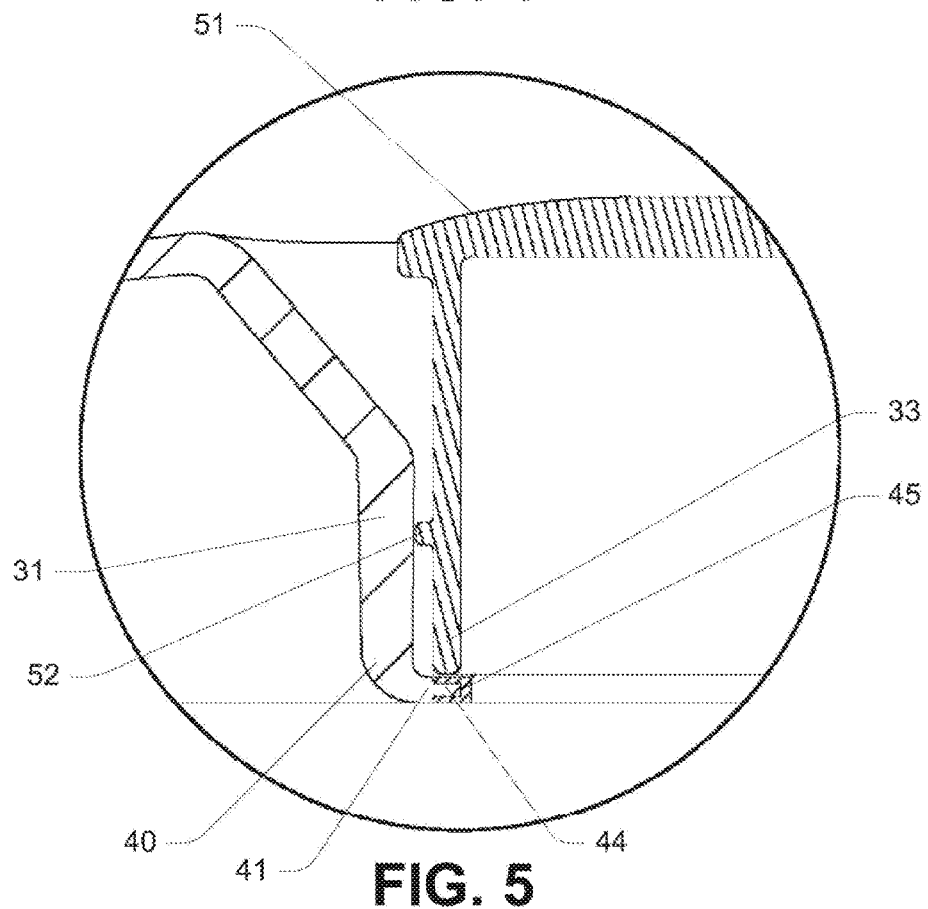
FIG. 5 is a cross sectional view of a collar and lid cap.

As shown in FIG. 3 and FIG. 3A, and with reference to FIG. 1, the main body 30 of the lid 12 and the core of the pull ring 19 may be formed from a rigid polymer, for example a clear polymer moulding. Preferred materials include polycarbonates or copolymers such as styrene acrylonitrile (SAN). Portions of the lid, for example, the integral surround and lip 16 may be formed from softer polymers, including elastomers such as thermoplastic elastomer (TPE) moulded over the main body. As will be discussed below, the primary seals are preferably silicone and manufactured separately then installed onto the lid structure. As shown in FIG. 3, the neck or collar 31 that receives the central cap 51 is formed integrally with and from the same material as the main body 30. The neck cooperates with a measuring cap 32 with a bayonet interconnection shown in so FIG. 3A. In this example, the entirety of the measuring cap is formed from a single polymer, for example, the same transparent polymer from which the main body is formed. The cap has a lower rim 33. A pair of male bayonet features 34 extends radially outward from the body 35 or lower rim 33 of the cap 32. Each bayonet feature may have a bead 72 (see FIG. 5, and FIGS. 6-8). The neck 31 incorporates a pair of opposing and longitudinal recesses 36 that receive and cooperate with the male bayonet features 34. As shown in FIG. 3A, once the bayonet features 34 have been inserted and are clear of the longitudinal slots 36, the cap 32 can be temporarily locked onto the lid 12 by rotating it. In its rotated position (as shown in FIG. 3A) the bayonet features 34 will be retained by detents or recesses 37. As shown in FIG. 3, the detents 37 are located adjacent to softer polymer bumpers 38 formed adjacent to the flat landing 39 across which the bayonet features 34 slides when moved into or out of engagement with the detents 37. The area defining the landing 39 and the detents 37 are defined by areas of reduced height that lie between the pair of opposing shoulders 40. In preferred embodiments, each shoulder 40 includes an overhanging section 41 that partially occludes the circular bore formed by the internal diameter 42 of the neck 31. Each shoulder 40 accommodates an overmoulded, softer, polymer insert 42, 43 as shown in FIG. 3A, FIG. 4 and FIG. 5. Although referred to as being overmoulded or moulded inserts, the softer polymer portions 42, 43 may be manufactured separately then applied. As suggested by FIG. 3, the overhanging portion 412 may incorporate a lip 44 that is received by a groove 45 in each insert 42, 43 for better keying or securing the insert to the overhanging portion. As shown in FIG. 5, the overhanging portion 41 and the polymer insert that is applied or overmoulded onto it forms a contact surface for the lower rim 33 of the cap. As shown in FIG. 4, each inset or overmoulded portion 42, 43 also includes terminal bumpers 38 and at an opposite end, optional second bumpers 49. As previously mentioned, the bumpers 38, when installed, are adjacent to the detents 37 so that a lateral side edge 50 of a male bayonet feature 34 rests against the bumper 38 when the cap is rotated into its locked position. In preferred embodiments, the location of the detent 37 ensures a slight compressive force between the bayonet feature 34 and the bumper 38. This reduces unwanted vibration of the cap 35 when the blender is in operation. As shown in FIG. 5, an outwardly directed intermediate lip 52 acts to centre the cap when it is located within the collar 31.

Figure 6:
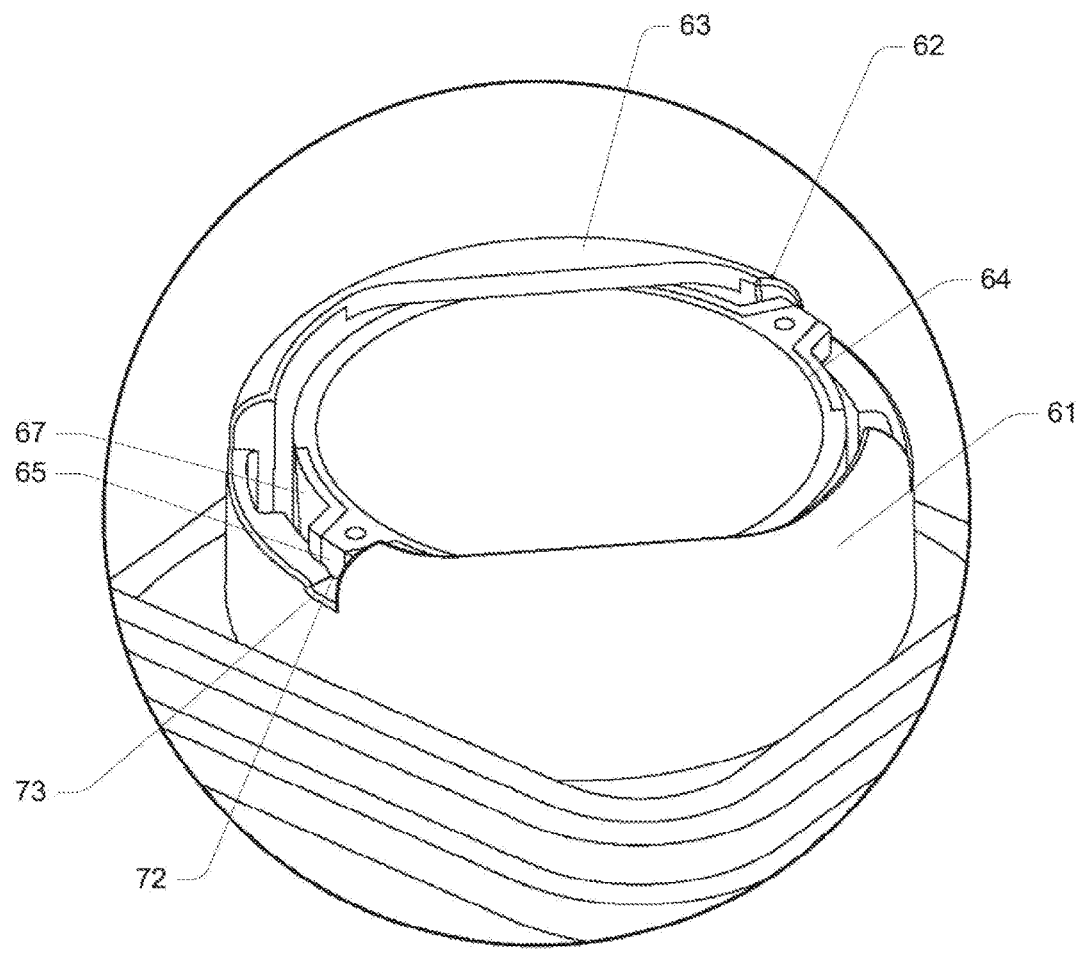
FIG. 6 is an inverted perspective view of an alternate embodiment of lid and lid cap.
Figure 7:
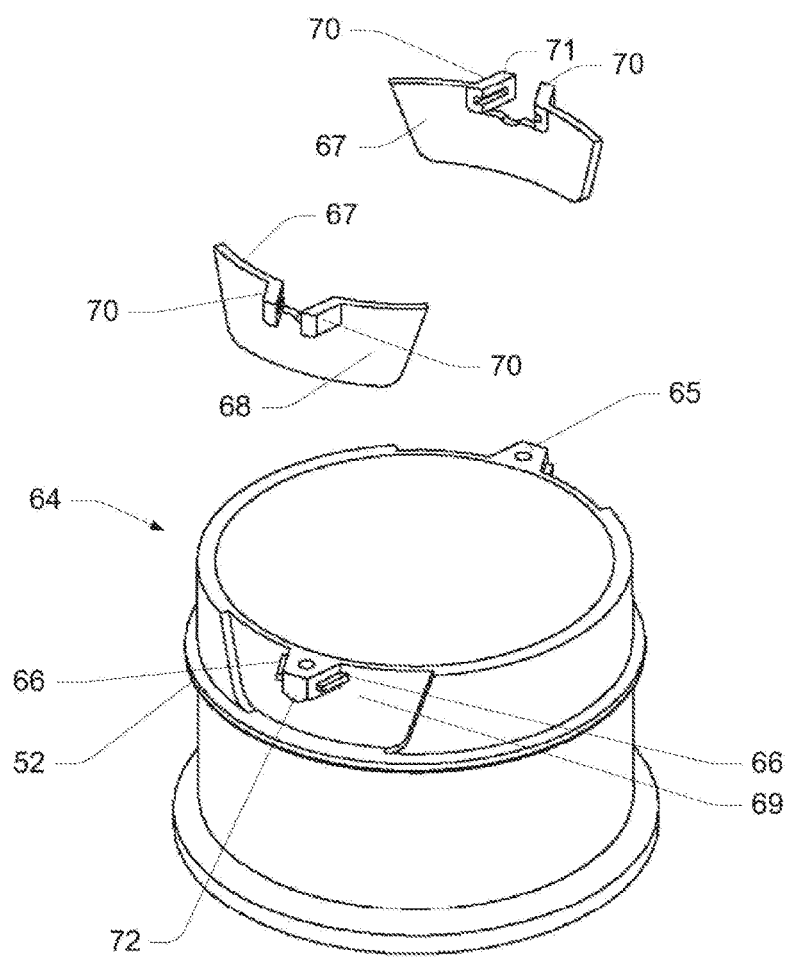
FIG. 7 is an exploded perspective view of a lid cap with soft polymer inserts moulded over the bayonet features.
Figure 8:
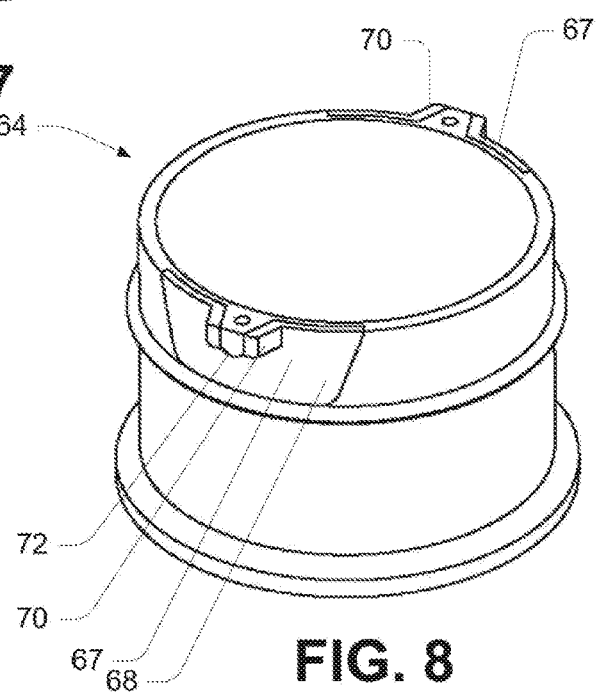
FIG. 8 is a perspective view of the lid cap shown in FIG. 7.

An alternate embodiment of the neck and cap is depicted in FIGS. 6-8. As shown in these figures, the neck 61, its bumpers 62 and shoulders 63 are formed integrally and from a single polymer. Unwanted vibration is reduced by softer polymeric inserts, moulded over or applied to the cap 64. As shown in FIG. 7, the male bayonet features 65 each comprise a radial projection. In preferred embodiments, each projection 65 is tapered, decreasing in width toward the radially outward direction. Each projection 65 has a lateral side featuring an optional rib 66. These optional ribs 66 promote engagement with the overmoulded or separately applied softer polymer cushions 67. Each cushion 67 comprises an apron 68 that is received by a cooperating recess 69 that surrounds the bayonet feature 65. As shown in FIG. 7, the softer polymer component or insert incorporates a pair of spaced apart projecting cushions 70 that receive and are permanently affixed to the bayonet feature 65. The cushions 70 may have slots 71 for receiving the ribs 66 found on the bayonet features 65. As shown in FIG. 6, an under surface of the protrusion forming the male bayonet feature 65 may have a projection or bead 72 for better engaging the detent 73.

Figure 8A:
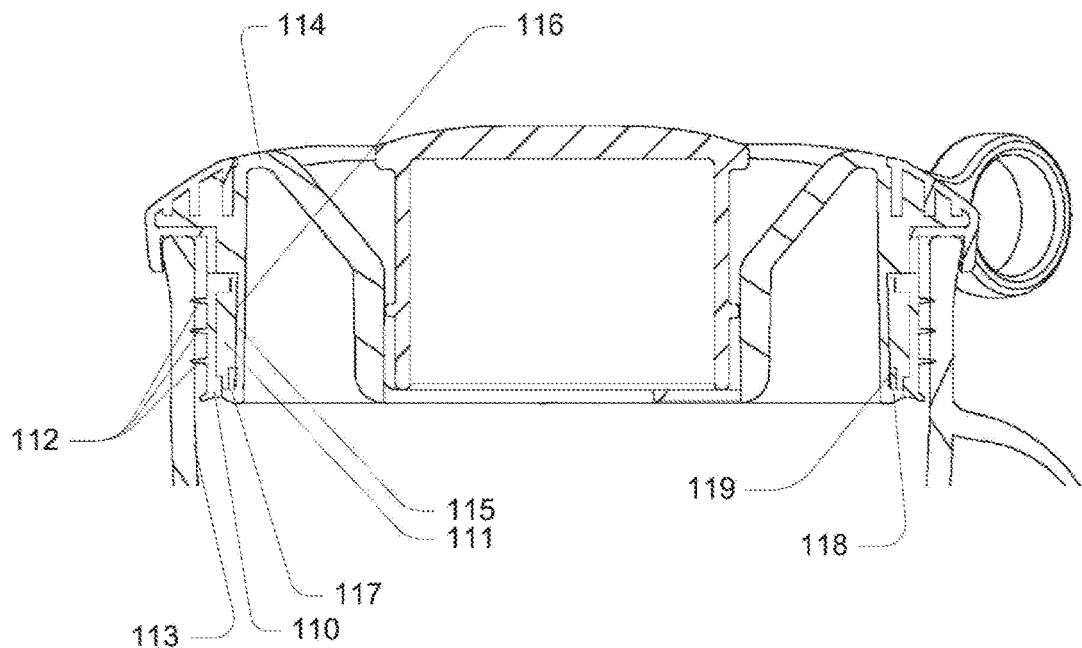
FIG. 8A is a cross sectional view through a lid and jug.

As shown in FIG. 8A, the lid's primary seal no comprises a first ring of silicone elastomer that is moulded over a second ring 111. The second ring is manufactured from a high temperature polymer such as nylon or a PPS material. The silicone ring no has one or more outwardly extending lips or beads 112 that are adapted to make contact with the inside surface 113 of the jug.

The main body of the lid 114 comprises a cylindrical side wall 115 in which is formed a groove 116. The groove terminates in a lip 117 that forms the lowest extent of the cylindrical side wall 115. The lip 117 preferably features a chamfer 118 that facilitates the assembly of the sealing ring no and its backing ring 111 over the lip 117 and into the groove 116. The backing ring 111 is elastic enough to temporarily stretch as it is being inserted over the lip 117, thereafter to return to its original shape once located in the groove 116. The backing ring 117 may have an inward facing shoulder or groove at a lower extremity for receiving a second seal 119 that seals between the backing ring 111 and the outer so surface of the cylindrical side wall 115.

Figure 9A:
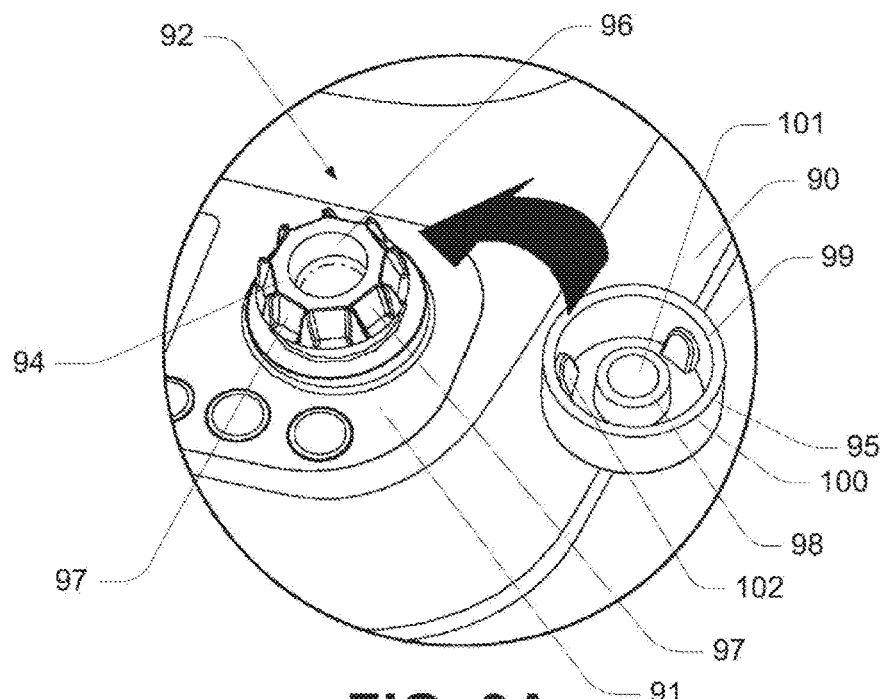
FIG. 9A is a perspective of a knob chassis and knob cap that are magnetically attracted to one another.
Figure 9B:
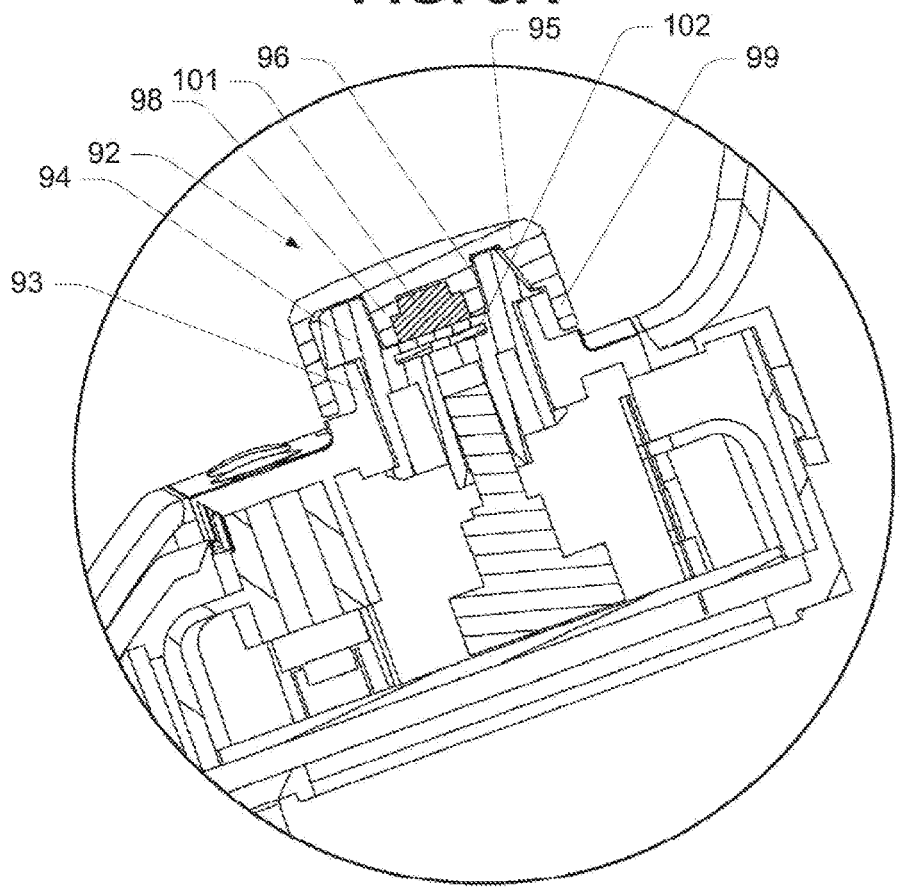
FIG. 9B is a cross section through the knob suggested in FIG. 9A.
Figure 10:
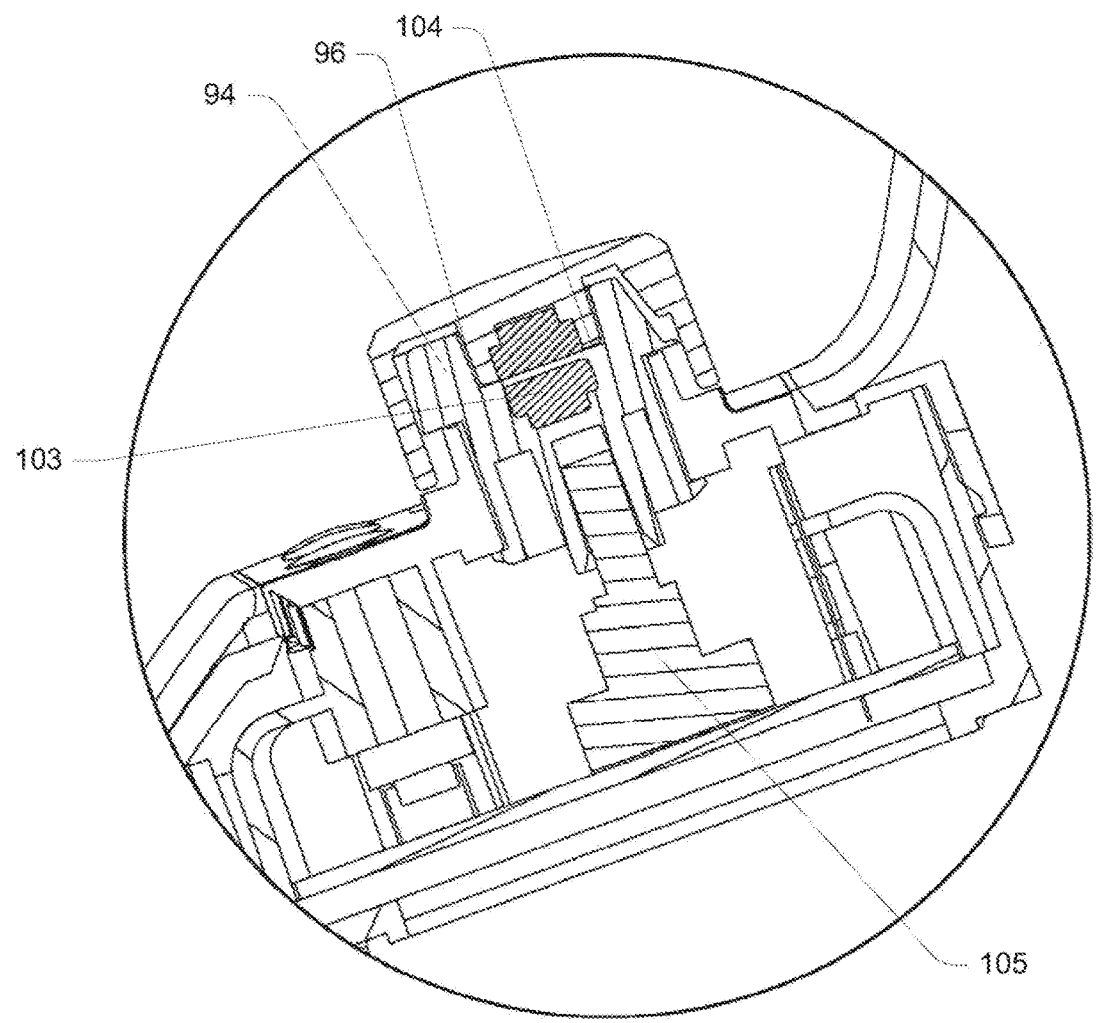
FIG. 10 is a cross section through an alternate embodiment of a knob chassis and knob cap with magnetic features.

As shown in FIG. 9A, a blender base 90 has a user interface 91. The user interface comprises the display, switches and controls required for the user to operate the blender. The interface 91 is likely to become dirty over time, particularly from the foods and beverages being handled by the blender. In the example of FIG. 9A, the interface includes a rotary knob 92 that, in this example, is used to control the speed of the blender's motor or other aspects of the operation of the blender. As shown in FIG. 9A and FIG. 9B, the interface portion comprises an upright rim 93 through which protrudes a knob chassis 94 that cooperates with a removable knob cap 95. In this example, the knob chassis 94 comprises a central recess or well 96 and an exterior peripheral wall subdivided by pockets 97. The knob 95 has an underside featuring a central island 98 located within the side walls 99 of the knob cap and preferably below the rim 100 of the side wall 99. A magnet 101 is located within the island 98. As shown in FIG. 10, when the knob cap is inserted over the knob chassis, the upper surface of the island 98 is adjacent to the floor of the well 96. This brings the magnet 101 into proximity with a metallic or ferrite insert 101 located close to or below the floor of the well 96. In order to better transmit torque between the knob cap and the knob chassis, internal fingers 102, located within the side wall 95 engage the pockets 97 formed around the periphery of the knob chassis. The strength of the magnetic attraction between the magnet 101 and the ferrite or metallic piece 102 prevents the knob cap from becoming displaced during ordinary use. As shown in FIG. 10, the metallic or ferrite insert 102 may be replaced by a permanent magnet 103 located below the floor 104 of the well 96. Neither the permanent magnets 101, 103 nor the ferrite or metallic insert 102 needs to be embedded or recessed with respect to the surface through which it is inserted. However, by inserting or covering the magnet or ferrite piece, cleaning and hygiene are facilitated. As shown in FIG. 10, the knob chassis 94 is adapted to receive the stem of a potentiometer or variable resistor 105 that communicates with the blender's processor.

Figure 11A:
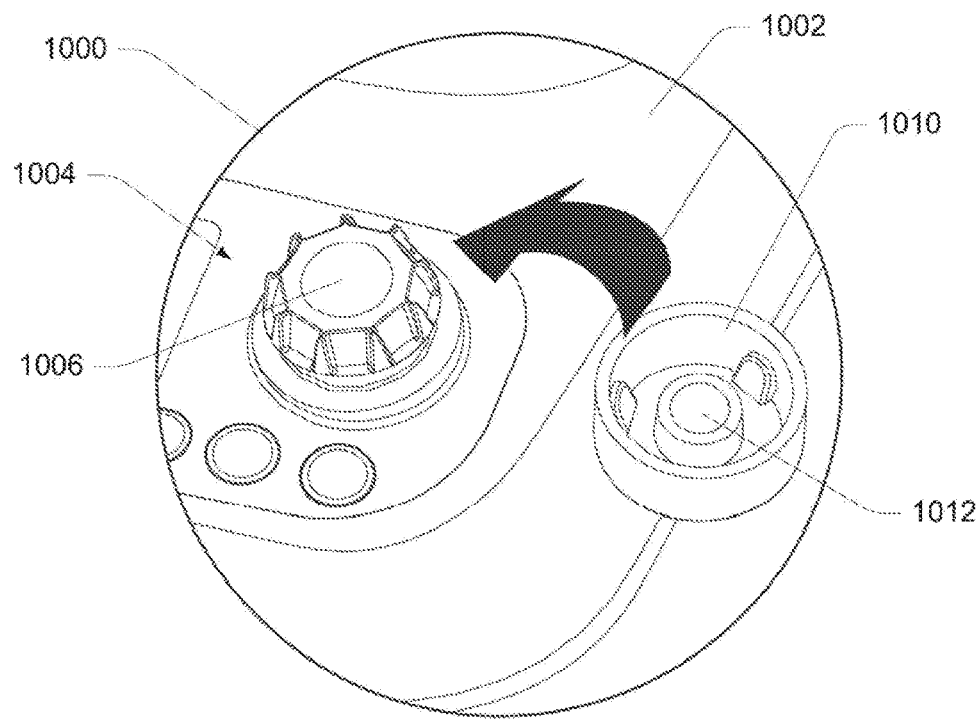
FIG. 11A is a perspective of an embodiment knob chassis and knob cap that are magnetically attracted to one another.
Figure 11B:
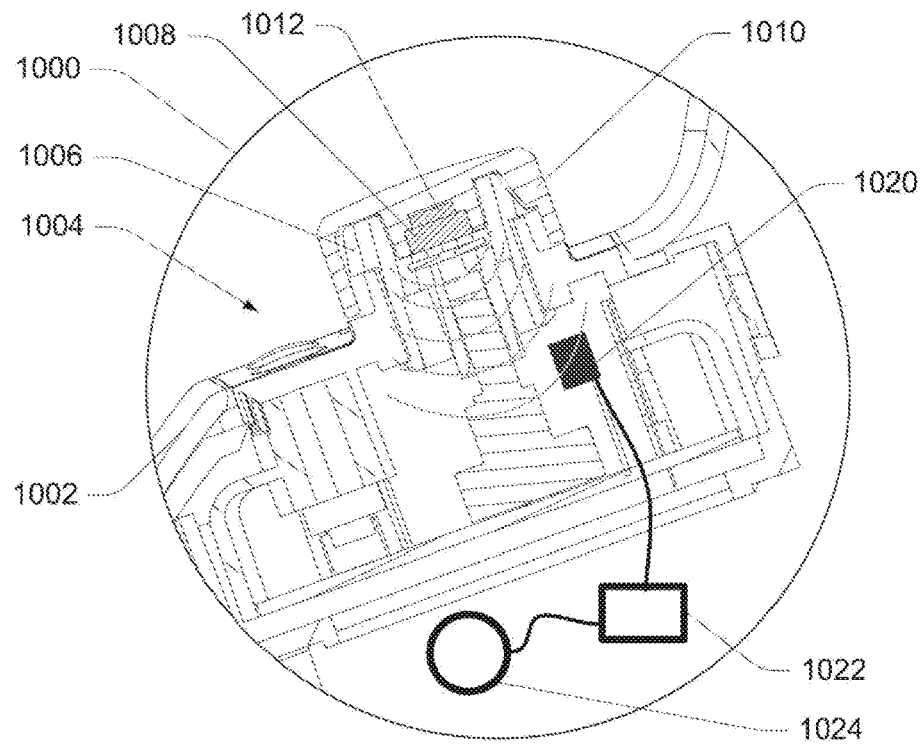
FIG. 11B is a cross section through the knob suggested in FIG. 11A.

FIG. 11A shows an alternative embodiment 1000 for a blender base 1002 having a user interface 1004. The user interface comprises the display, switches and controls required for the user to operate the blender. In the example of FIG. 1A, the interface includes a rotary knob or dial 1006 that, in this example, is used to control the speed of the blender's motor or other aspects of the operation of the blender. As shown in FIG. 11A and FIG. 11B, the interface portion and knob/dial substantially conforms to that disclosed in FIG. 9A and FIG. 9B.

In an embodiment, a cap (or collar) 1010 is adapted to releasable engage or cover the knob/dial. It will be appreciated that the appliance may include a sensor or reader 1020 for detecting proximity of the cap (or collar) 1010.

In an embodiment, a cap 1010 is adapted to releasable engage the knob/dial. A magnet 1012 is located within the cap. As shown in FIG. 11B, when the knob cap is inserted over the knob chassis, and the magnet 1012 is brought into proximity with a metallic or ferrite insert 1008. The strength of the magnetic attraction between the magnet and the ferrite or metallic piece prevents the knob cap from becoming displaced during ordinary use. It will be appreciated that the appliance may include a sensor 1020 (for example a Hall Effect sensor) for detecting the proximity of the cap (for example the magnet within the cap).

In an embodiment, a processor module 1022 receives a signal indicative of the cap 1010 being detected as located about the knob 1006. The processor module enables the appliance (or appliance motor 1022) only when the cap is detected, or otherwise deactivates the appliance (or appliance motor) when the cap is removed.

Figure 12:
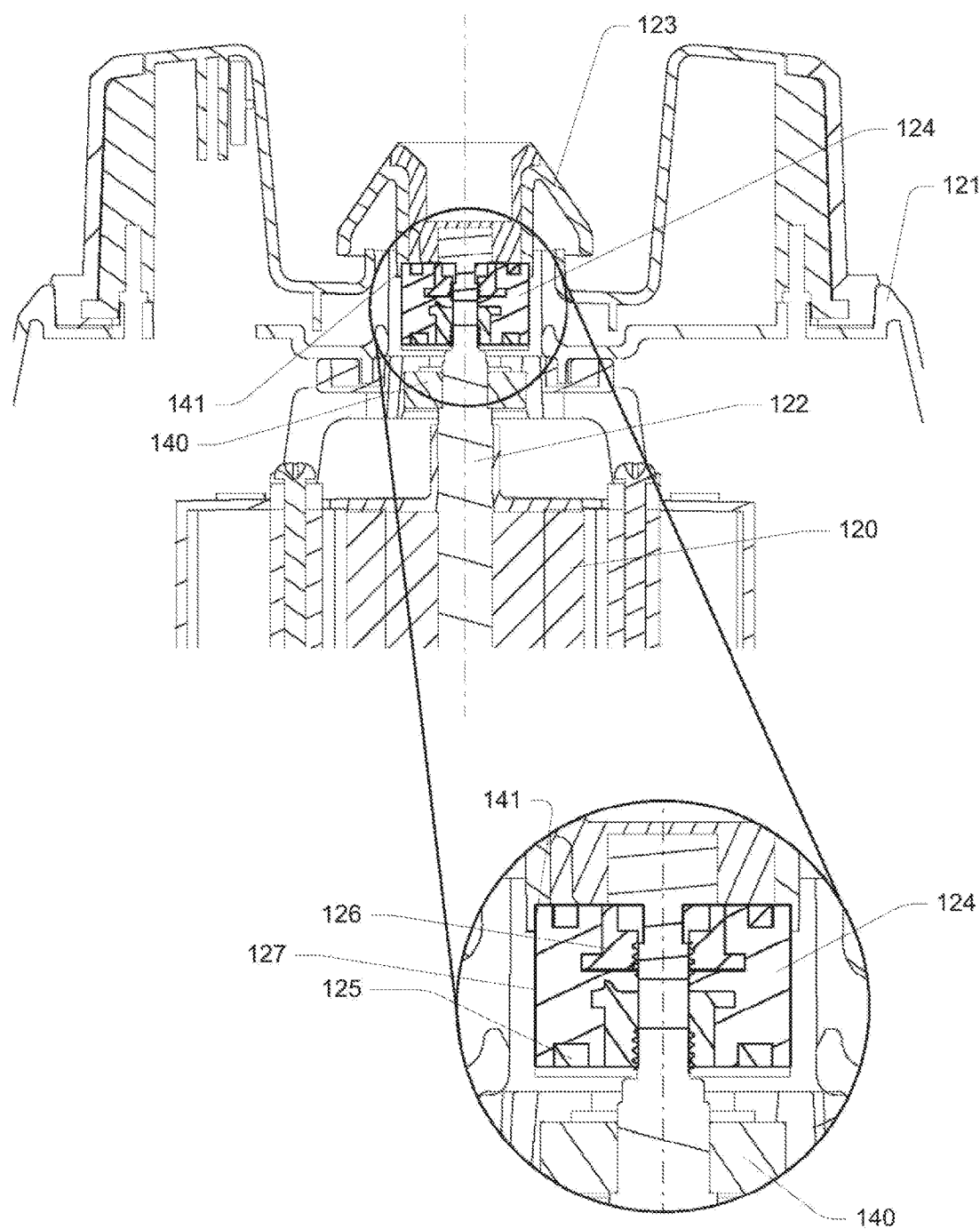
FIG. 12 is a cross sectional view and a cross sectional detail of a resilient coupling used between a blender's motor and a coupling.

As shown in FIG. 12, the motor 120 within the blender's base 121 has an output shaft 122 that drives a female coupling 123. The shaft is supported at an upper end with a bearing 140. In this example, a torsionally resilient coupling 124 is interposed between the output shaft 122 and the coupling 123. It is preferably located directly below and in contact with an underside of the coupling 123. It may be received by a shoulder 141 on an underside of the coupling 141. The torsionally resilient coupling reduces or dampens vibration in the drive train and also is able to accommodate a small degree of misalignment between the female coupling 123 and the male coupling (not shown) that is associated with the blades in the jug. In this example, the coupling 124 comprises two metallic hubs 125, 126 around which is moulded a flexible polymer body 127.

Figure 13:
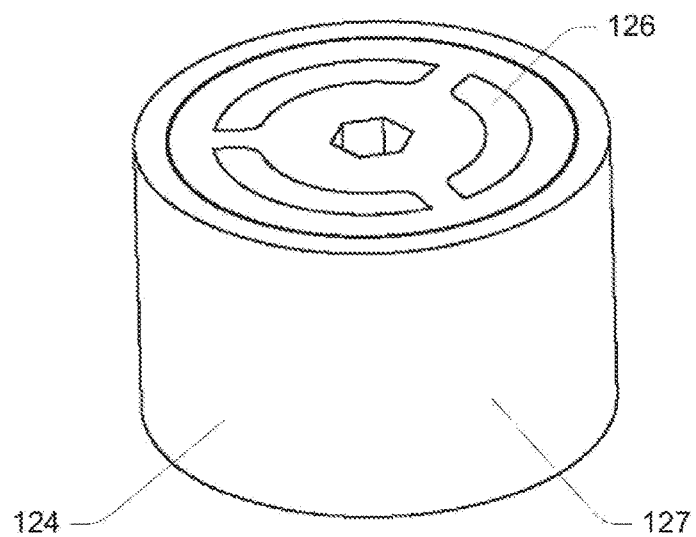
FIG. 13 is a perspective view of the torsionally resilient coupling depicted in FIG. 12.
Figure 14:
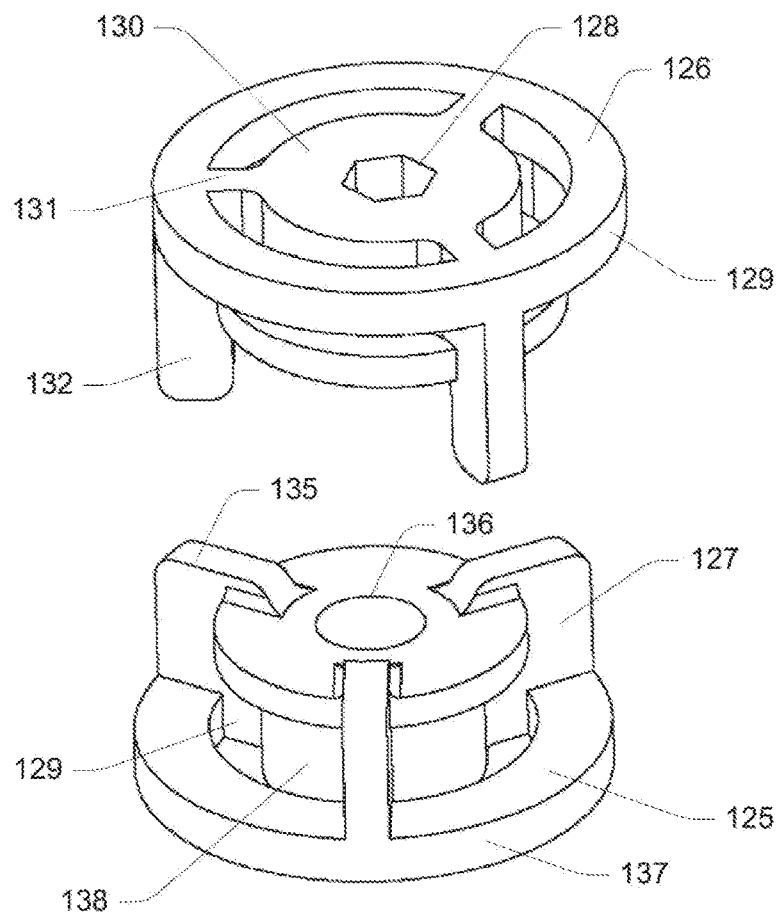
FIG. 14 are perspective views of the upper and lower hubs in the coupling depicted in FIG. 13.

As shown in FIG. 13 and FIG. 14, the upper hub 126 comprises a hexagonal bore 128. A ring 129 surrounds the central part 130 of the hub and is connected to it by three spokes 131. The central part 130 and the ring 129 support, in this example, three downward facing extensions or fingers 132 that interdigitate with an equal number of vertically oriented fingers or fins 135 located on the lower hub 125. In this example, the lower hub has a threaded cylindrical bore 136 and a circumferential ring 137 interconnected to the main body 138 of the hub by three radial spokes 139. Torsionally resilient couplings of this kind are known in industry and this precise shape and configuration of the hubs is not required to provide damping and misalignment capabilities. However, the arrangement depicted has been found to be particularly useful in the context of a motorised blender.

Figure 15:
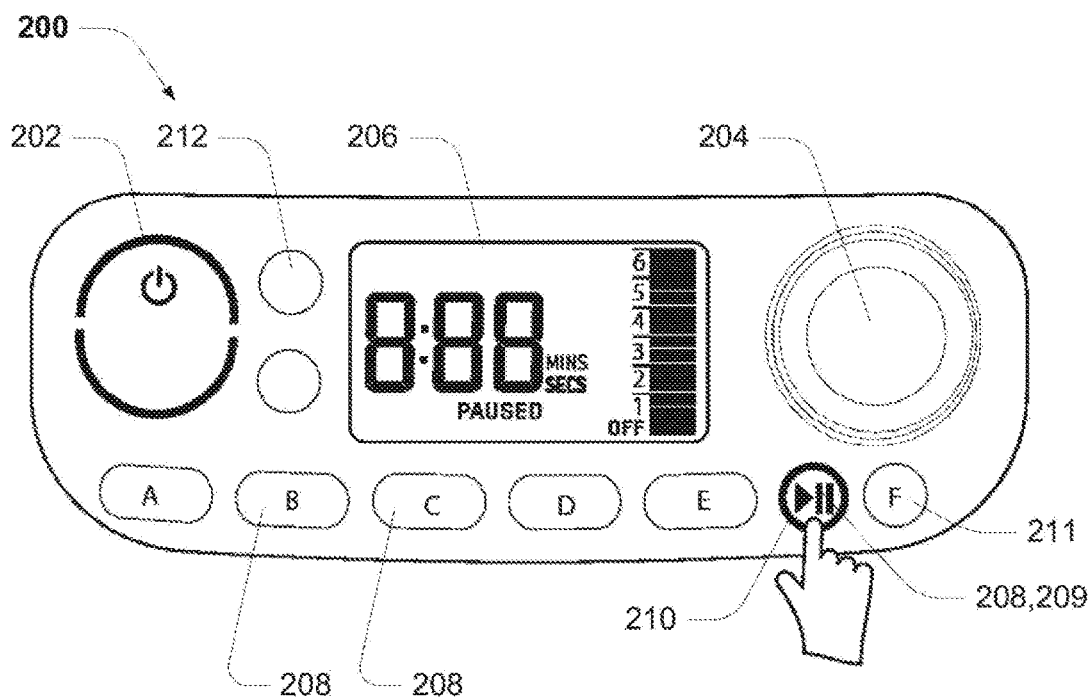
FIG. 15 is a schematic layout of an embodiment user interface for a blender apparatus.

FIG. 15 shows a schematic layout of an embodiment user interface 200 for a blender apparatus (not shown).

In this embodiment, by way of example only, the user interface includes a speed or power selector 202, a speed selector 204 in the form of a speed selection dial, a display element 206 and a plurality of function selection elements 208 and an input selection element 211. In some embodiments, the input selection element 211 may be used as a save selection element, used to save recorded blending sequences.

The function selection elements include a play/pause selection element 209. A function of the play/pause 209 selection element is to enable, upon user selection, a momentary pause of any blending operation or function that is currently being undertaken by the blender apparatus. This pause function can typically be used in any manual or preset operating mode of the blender apparatus. The processor module can disable power to the blender blades, and can suspend any manual or preset operating mode currently in progress. The user can select "play" (for example by re-selecting the play/pause button/element) for resuming any manual or preset function mode that has been suspended. It will be appreciated that this enables a user to momentarily suspend blending without interrupting a manual or preset function mode, thereby to enable adding of ingredients or attending to other matters.

The display element 206 can alert a user (typically via a graphic display) that a paused mode is currently active. The pause selection element can also be illuminated (for example by a LED surround 210), for alerting the user that the pause mode is active (for example by using illumination and/or flashing).

It would be appreciated that the pause selection can be incorporated in a preset function mode, or recorded into a user defined function, maintained by the blender apparatus.

Figure 16:
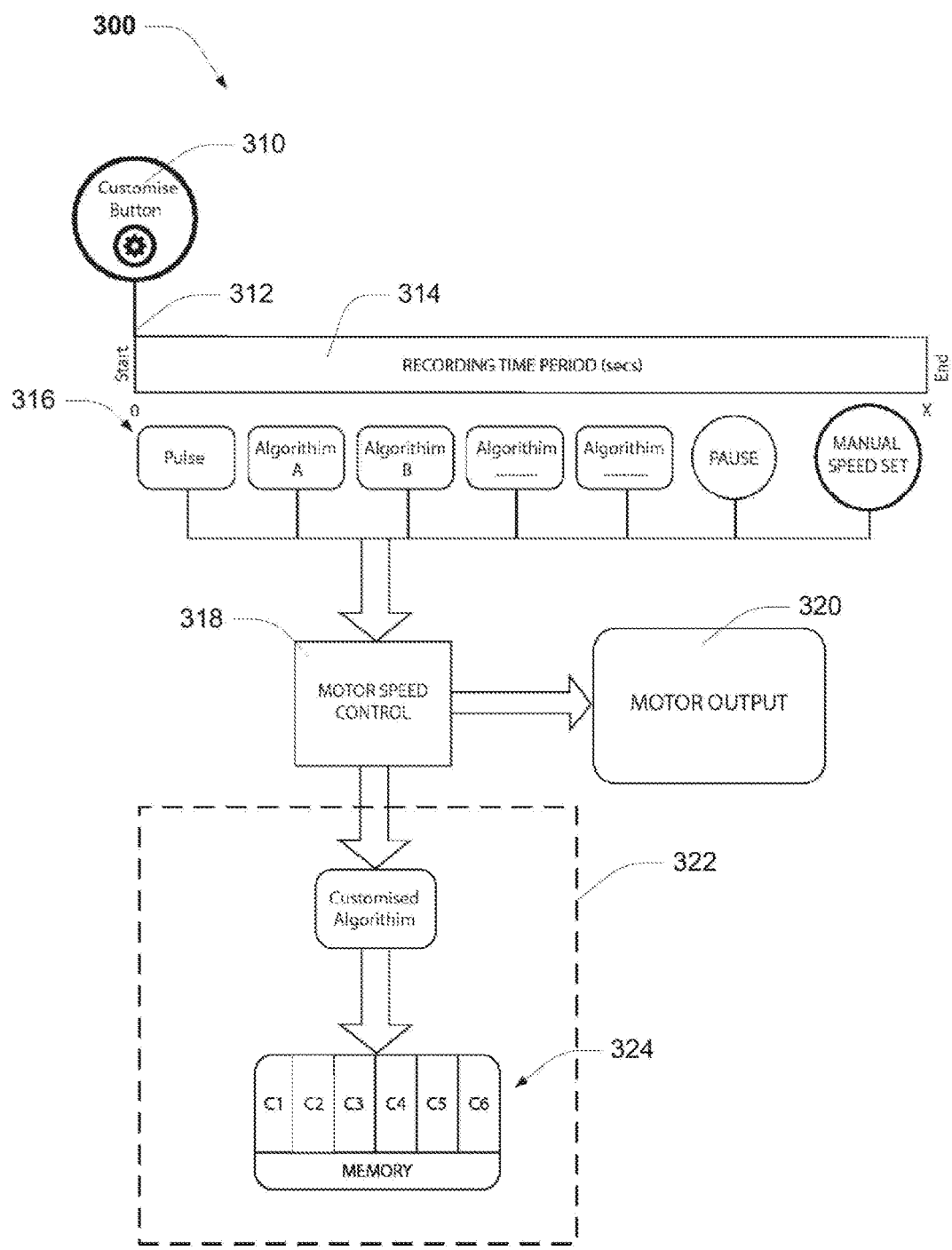
FIG. 16 is a schematic flow diagram for a method of programming a blender apparatus using a user interface.

FIG. 16 shows a schematic flow diagram 300 for a method of programming a user defined function in a blender apparatus using a user interface.

In this embodiment, by way of example only, a blender apparatus can be configured and/or programmed for a user defined/preset function mode. For example, a user can select a customised input selection element 310 (for example element 211 of FIG. 15) to commence a preset function recording. The recording can typically commence at time 312, after a first user input to the user interface. During the record time period 314, inputs to the user interface are recorded and saved in volatile memory, such as RAM. The inputs to the user interface (indicated at 316 by way of example) can include user selection of pulse mode, pulse function mode, one or more preset algorithms or functions, manual speed settings and/or pause selection. The user inputs are each received by a processor module 318 that then enables, in accordance with the user selection, control of the motor and blender blades 320. Typically the record time is limited to a predetermined time period (for example 120 seconds, 4 minutes, to minutes etc.), depending on the amount of RAM accessible by the processor.

The end of recording a blending sequence may be indicated in a number of different ways. For example, the end of a recording sequence may be indicated when the user input ends the operation of the motor (in other words, not selecting the pause function, but by disabling the manual speed set or by not selecting any of the preset functions). Alternatively or additionally, the end of a recording sequence may be indicated by a user input, e.g. via an "end of recording" button selection with one or more of the function selection element 208, or selection of a menu item using the customised input selection element 310.

At the end of a recording, the user is provided with the option of saving the recorded sequence (which at that stage resides on the volatile memory or RAM). In some embodiments, a prompt is displayed providing the user with this option and/or related instructions. Upon selection of a save option (e.g. via a "save" button selection with one or more of the function selection element 208, or selection of a menu item using the customised input selection element 310), the recorded blending sequence is stored in a non-volatile memory 322. Non-volatile memory 322 may be in the form of an EPROM or flash memory.

If the user does not save the recorded blending sequence, the recorded sequence will be lost either when it is overwritten when another blending sequence is recorded, or when the blender is powered down.

Typically the customised configuration or parameter memory can hold a plurality of user selectable time based recordings of user defined or customised functions 324. A user can typically select which one of the plurality of customised memory regions or slots are used for recording a specific time based user input sequence. Alternatively the processor module can select an available memory slot, by way of selecting a currently unused memory slot or overwriting an existing customised recording (for example, the oldest recording).

A user can select that a particular memory slot be write protected, for preventing accidental overwriting or deletion of a recorded and saved customised sequence.

Figure 17:
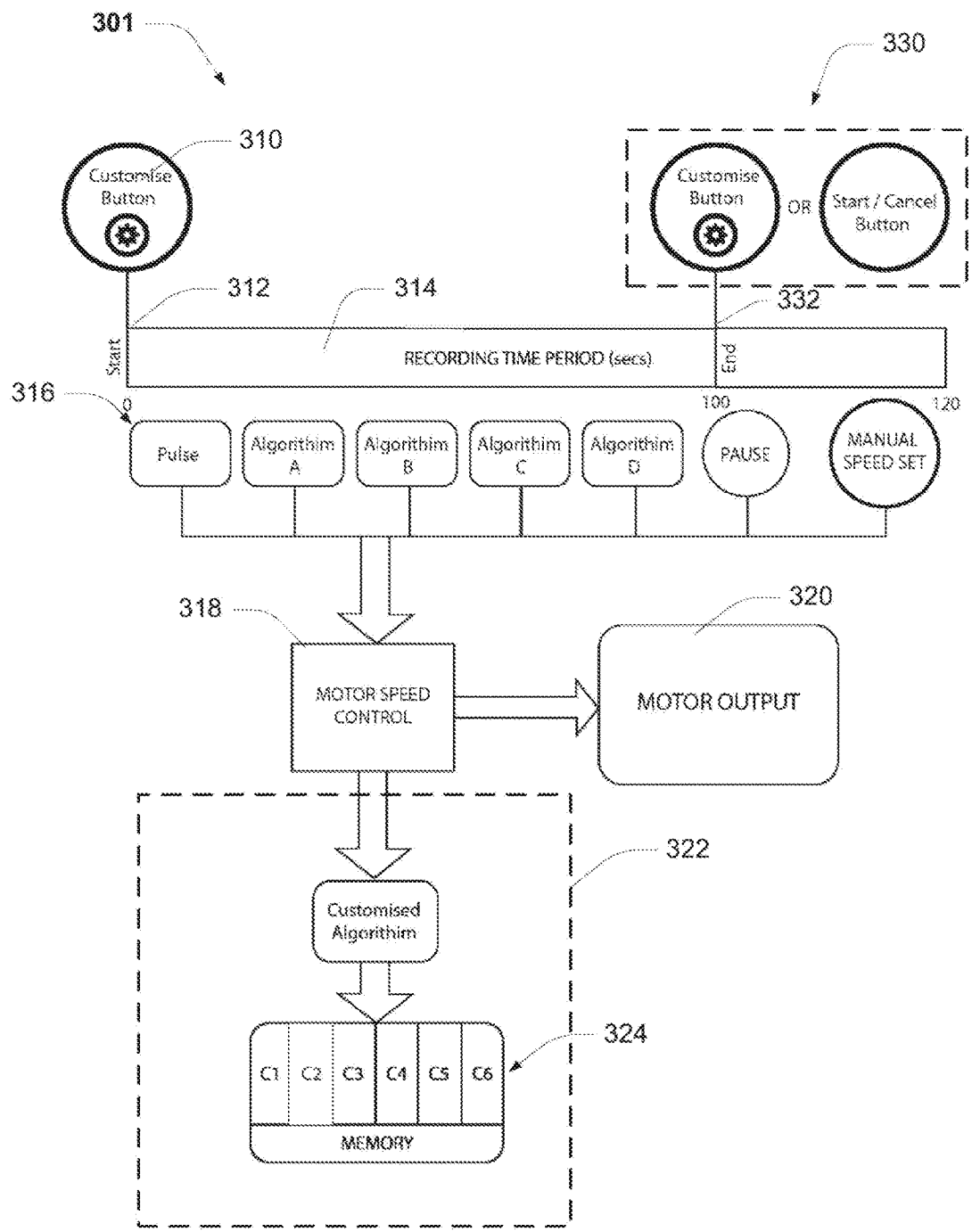
FIG. 17 is a schematic flow diagram for a method of programming a blender apparatus using a user interface.

FIG. 17 shows a schematic flow diagram for a method 301 of programming a blender apparatus using a user interface.

In this embodiment, by way of example only, upon user input 330, a recording time period can be concluded or terminated 332.

For example a user can cease blender operation, and/or reselect the customised select element and/or select a start button or cancel button. Upon conclusion of a recording time period, the processor module automatically saves the recorded blending sequence to non-volatile customised memory 322 without first so requiring user input to select a "save" option.

Figure 18:
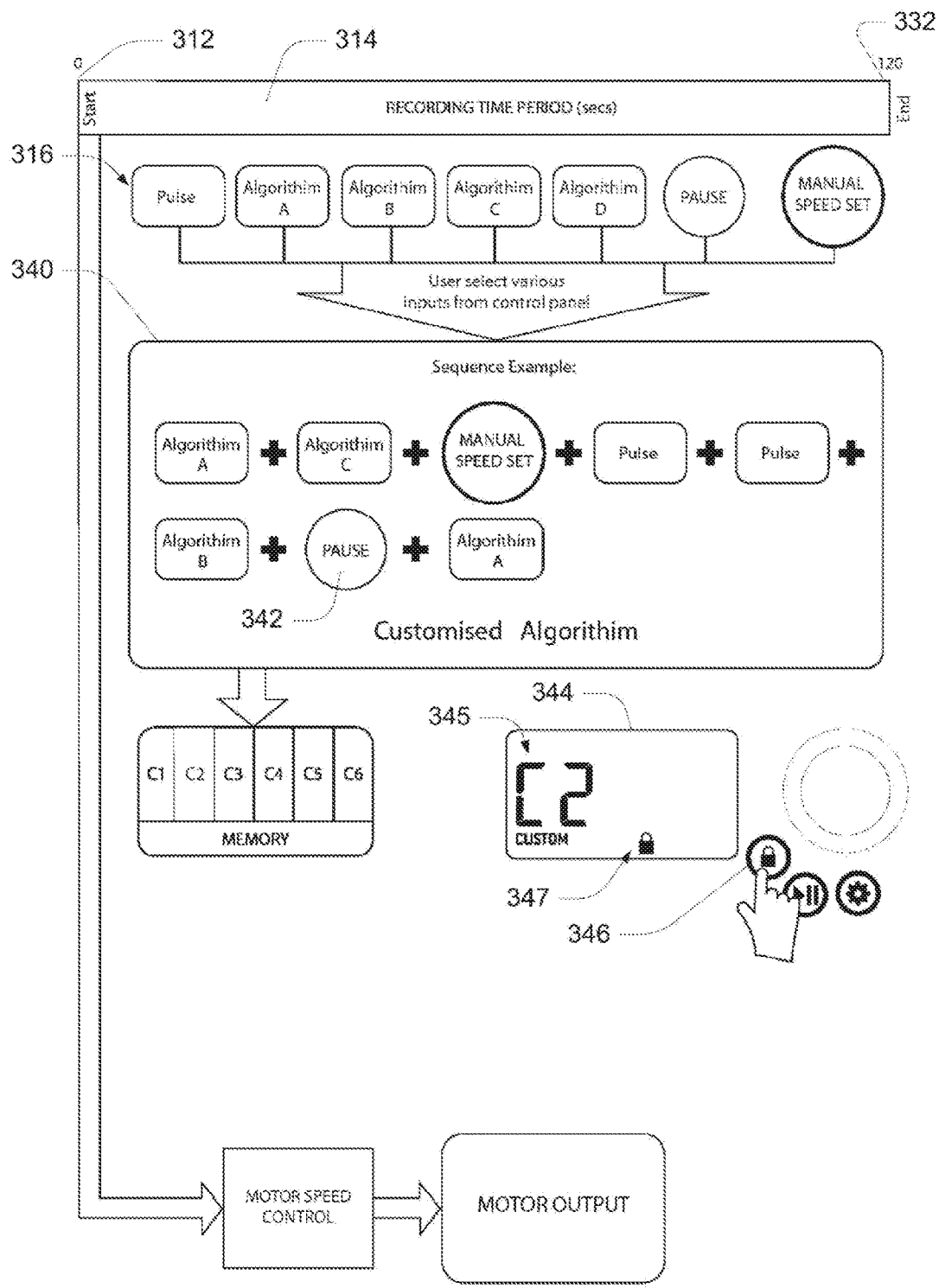
FIG. 18 is a schematic flow diagram for a method of programming a blender apparatus using a user interface.

FIG. 18 shows a schematic flow diagram for a method of programming a blender apparatus using a user interface.

In this embodiment, by way of example only, user input time sequence 340 can be recorded as a sequence of user inputs at a relative time or as actual user inputs across the recording time period (or sampled time period). It will be appreciated that the selection of pause 342 during the recording time period can either incorporate the pause selection into the customised sequence or temporarily suspend the recording. The user can then repress pause (or resume) to resume operation of the blender apparatus or to resume the recording of the customised sequence (depending on which one of these two configurations the blender incorporates).

The user display element 344 can present the currently selected custom sequence and associated memory slot 345. Each customised sequence can be write-protected, either by default or by user selection 346, which can be indicated by a display icon presented on the display element 347. It will be appreciated that a user can typically select a preferred memory slot for storing a recorded customised sequence (typically prior to or at the conclusion of the recording sequence). Alternatively the memory slot can be automatically selected by the processor.

Figure 19:
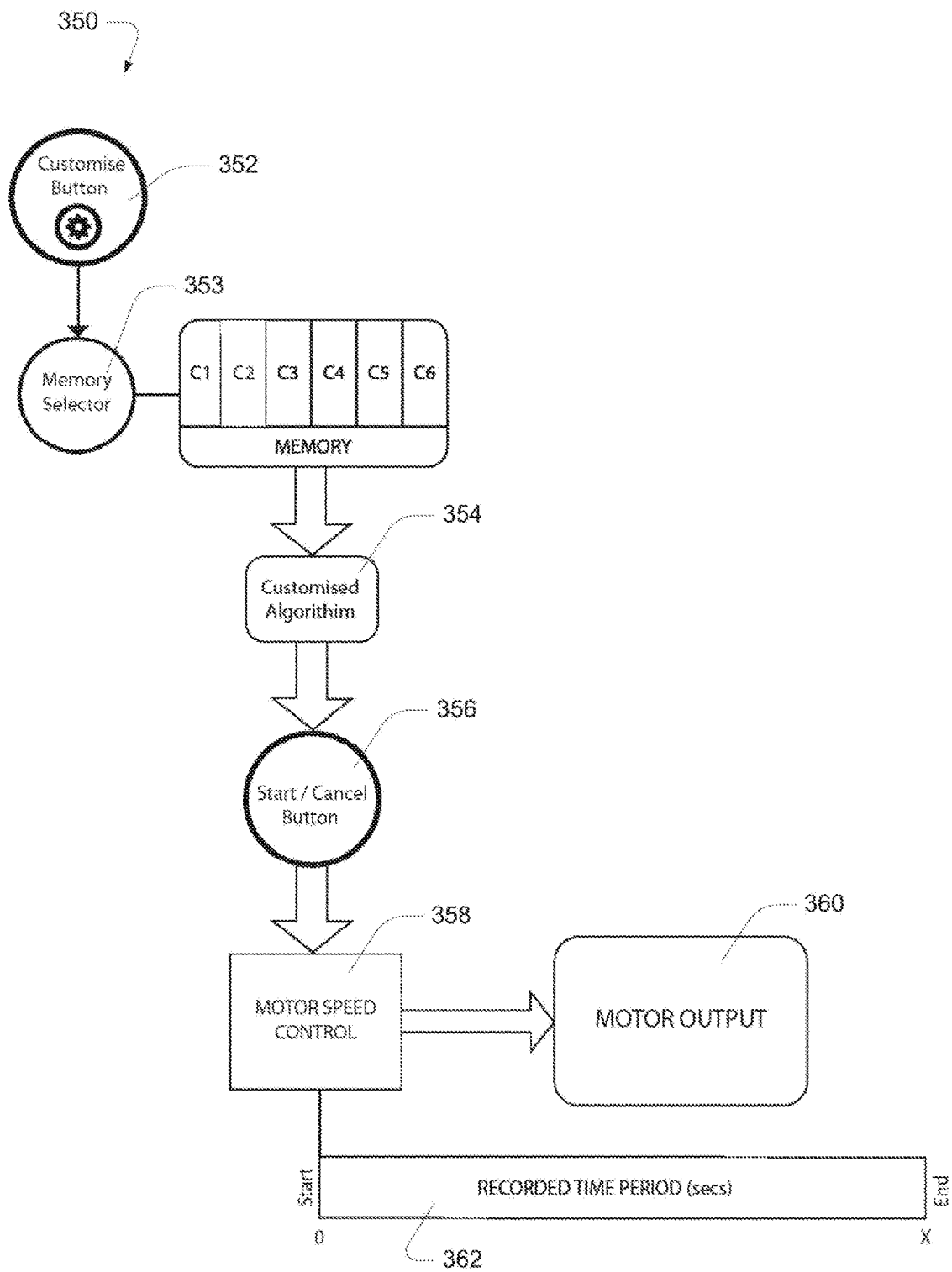
FIG. 19 is a schematic flow diagram for a method of implementing a function programmed on a blender apparatus using a user interface.

FIG. 19 shows a schematic flow diagram for a method 350 of implementing a function programmed on a blender apparatus using a user interface.

In this embodiment, by way of example only, a stored customised sequence can be recalled or replayed. In this example, a user can select a customised mode (at 352), selecting a customised sequence or memory slot (at 353).

Upon user selection of a customised sequence, the selected customised sequence can be retrieved or read (at 354) from non-volatile memory and copied to the processor's RAM for replay. Upon user input to start or commence a customised sequence (at 356) data indicative of the customised sequence is used by the processor module to control the motor speed (at 358) so that the blender motor replays the recorded blending sequence (at 360) over the recorded time period (at 362).

The recorded customised sequence can include a pause mode, which when actioned, awaits user input to resume the customised sequence. Resumption from such a paused mode will resume the previously configured manual or preset mode of blending operation according to the recorded customised sequence. Typically resumption of a blending mode imposes a slow/soft start profile to the speed of the blender blades. In other embodiments the recorded pause mode does not require a user input, but is activated for a recorded period of time before proceeding a subsequence blending step.

It will be appreciated that the user can also select to pause a customised sequence. Resumption from such a paused mode will resume the previously active customised sequence. Typically resumption of a blending mode imposes a slow/soft start profile to the speed of the blender blades.

Figure 20A:
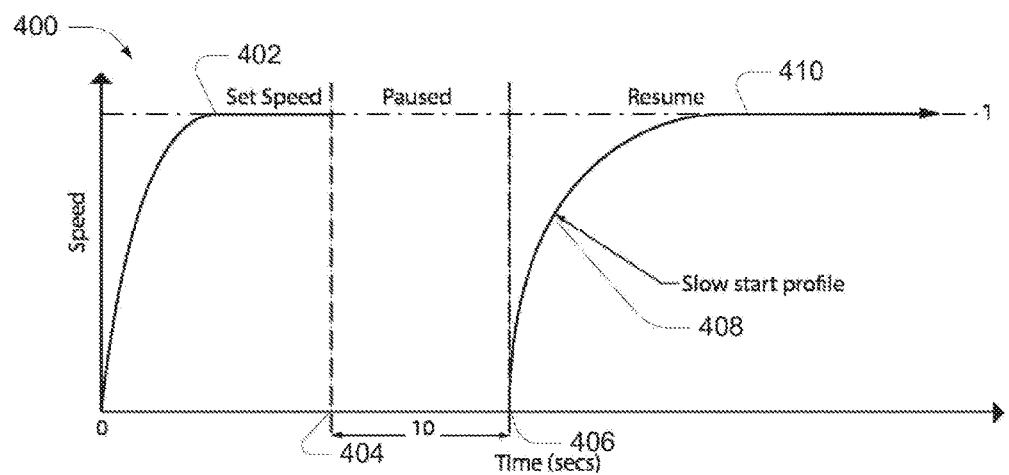
FIG. 20A is a line graph representing an embodiment speed profile of a blender apparatus, shown resuming from a pause mode.

FIG. 20A shows line graph 400 representing an embodiment speed profile of a blender apparatus, shown resuming from a pause mode.

In this example embodiment, a blender operating in a manual mode at a set speed 402 when a user selects a pause mode at time 404, wherein the processor module disables power to the blender motor and blades. After a time period 406 the user selects to resume the manual mode, wherein the processor module applies a slow/soft start profile 408 to the speed of the motor and/or blades. The processor module controls the blender motor to resume to the preset speed 410.

Figure 20B:
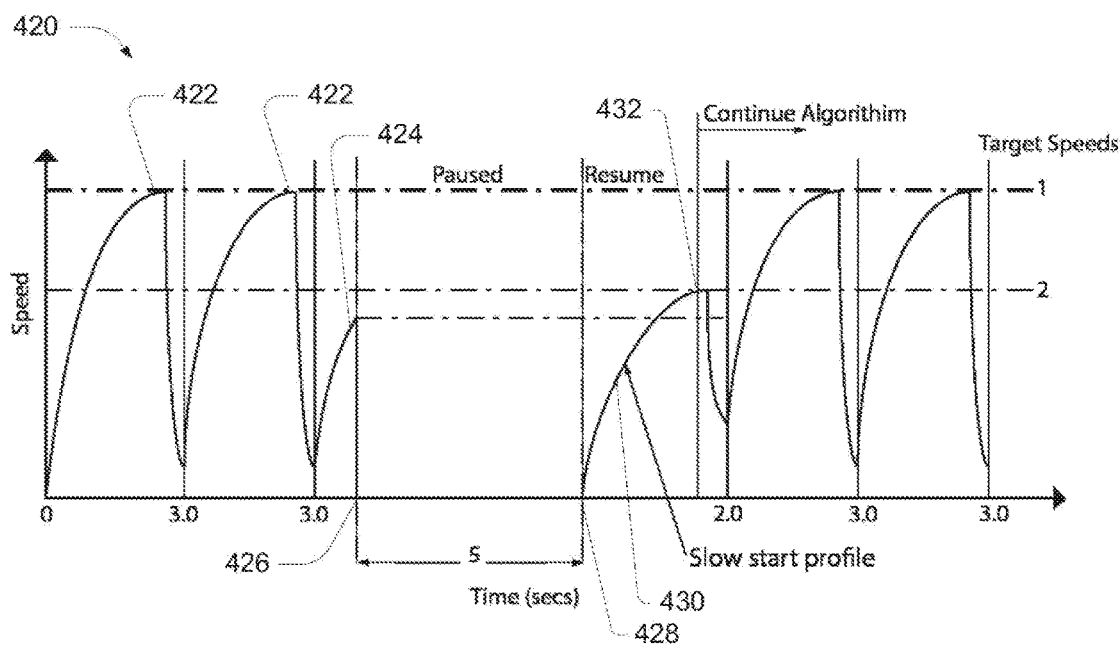
FIG. 20B is a line graph representing an embodiment speed profile of a blender apparatus, shown resuming from a pause mode.

FIG. 20B shows a line graph 420 representing an embodiment speed profile of a blender apparatus, shown resuming from a pause mode.

In this example embodiment, a processor module controls the blender motor to perform a sequence of pulsed rotations 422. During a pulse cycle 424, a user selects a pause mode at a time 426, which causing the processor module to disable power to the blender motor. After a time period 428, the user selects to resume the preset algorithm or function mode, causing the processor module to commence resumption of the preset function. In this example that processor module first initiating a slow/soft start speed profile 430 and then, upon reaching the preset target speed at 432, continues the preset function mode.

Figure 21:
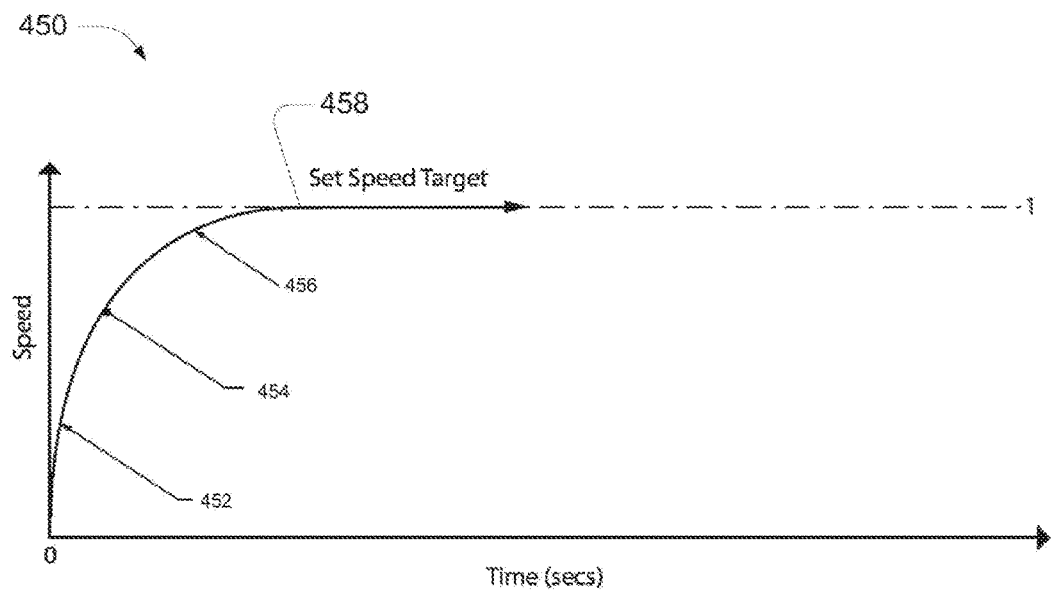
FIG. 21 is a line graph representing an embodiment speed profile for a soft start of a blender apparatus.

FIG. 21 shows a line graph 450 representing an embodiment speed profile for a soft start of a blender apparatus.

In this example embodiment, a soft/slow start speed profile for a blender motor and/or blender blades is applied to provide an initial steep speed gradient (at 452), such that the speed gradient (at 454) decreases during the slow/soft start profile, such that the power is applied to provide a lower speed gradient while approaching the target speed (at 456 and 458).

Soft Start Profile

By way of example only, a soft start profile can be described as follows. The power to the motor is controlled as variable "Y"—such as control of the firing angle of a control triac.

In this example:

ΔTarget is set as the difference between a target speed (Speed_Target) and the actual speed (Speed_Actual):— ΔTarget=Speed_Target−Speed_Actual.

ΔSpeed is set as the difference between the speed at time T2 (Speed_T2) and the speed at time T1 (Speed_T1), therefore T2>T1 defines a predetermined time interval:— ΔSpeed=Speed_T2−Speed_T1.

If Y<0 then Y=0.

In this example, variable "Y" is defined by the following equations using predetermined constants k1 and k2.

$$Y = k1 * (\Delta \text{Target}/\text{Speed Target}) - k2 \times \Delta \text{Speed}$$

In an embodiment, once the motor speed reaches a target speed, the slow start function can terminate and a speed control algorithm or function (such as PID control) commence to take over speed regulation of the motor.

Stir Function

Figure 22A:
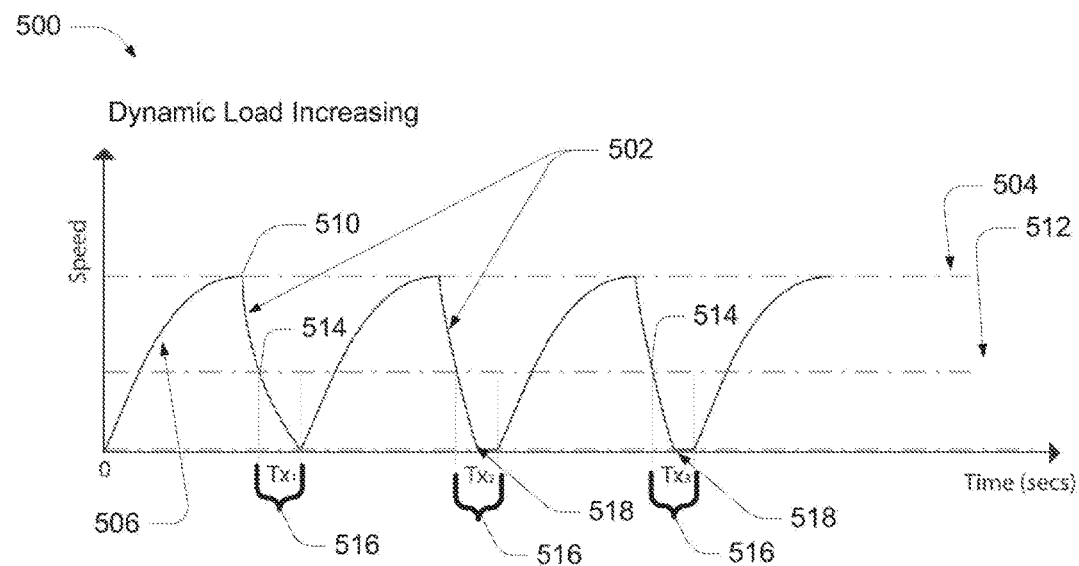
FIG. 22A-22F are each a line graph representing an embodiment speed profile for a stir function of a blender apparatus.
Figure 22B:
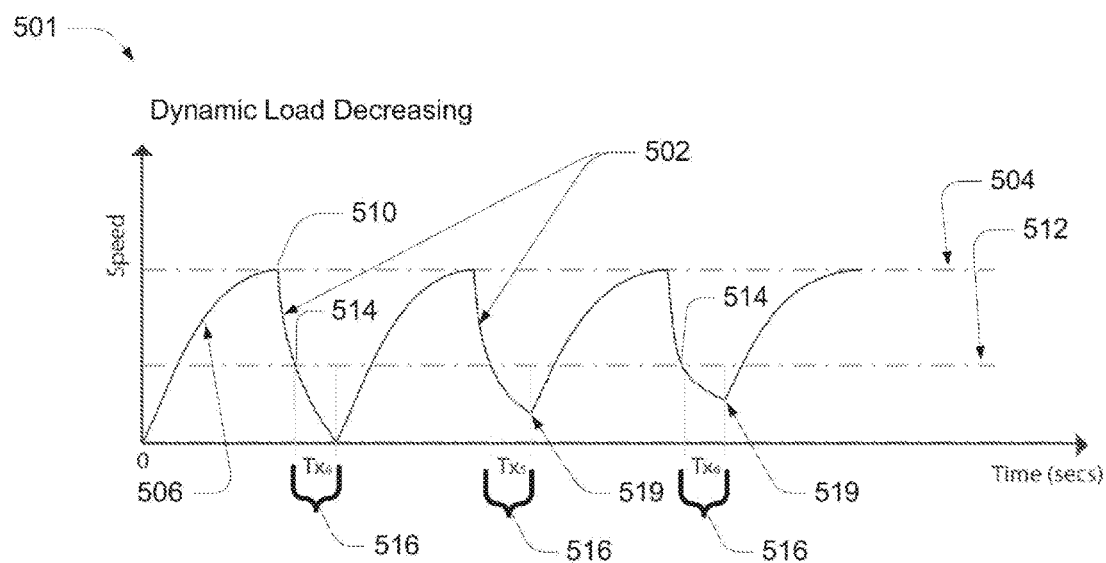
Figure 22C:
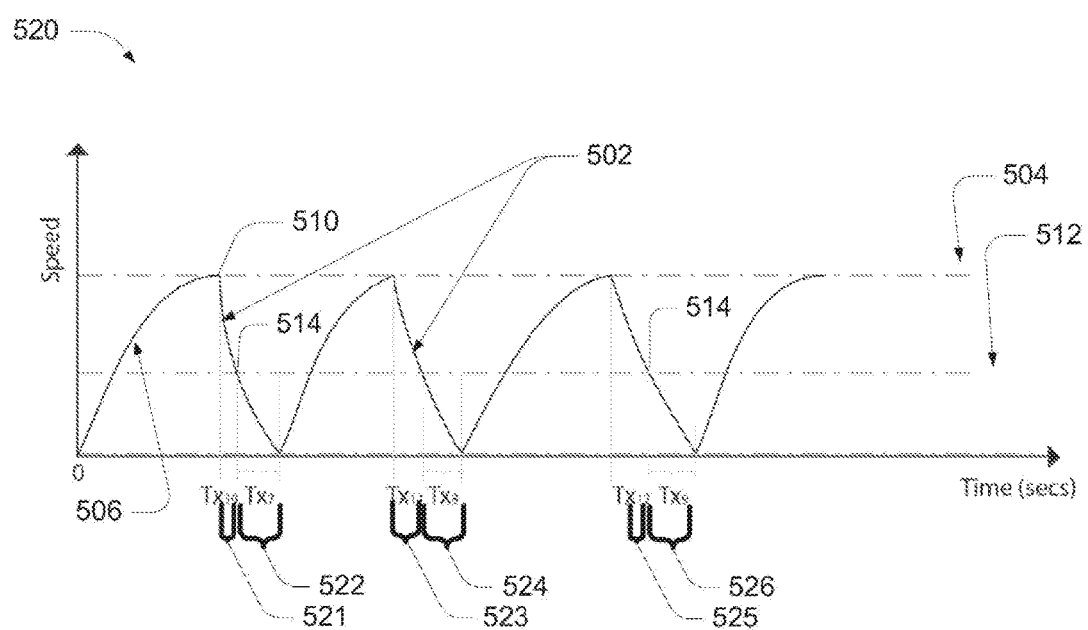

To overcome a difficulty with regulating universal motors at very low speeds (for example below 600 RPM), power to universal motors can be pulsed as shown in FIG. 22A through FIG. 22C.

In an embodiment, by way of example only, the motor is controlled by/with "soft start" profile until a target speed reached. Once a target speed is reached, power to the motor is discontinued (or removed). The motor speed is then monitored, to identify when a predefined minimum speed is reached, then providing a predetermined wait time Tw. It will be appreciated that, if the target predefined minimum speed is zero, a predetermined wait time Tw may not required Then "soft start" profile is then repeated.

FIG. 22A through 22F each show line graphs representing an embodiment speed profile for a stir function of a blender apparatus.

For example, referring to FIG. 22A and FIG. 22B, referring to graphs 500/501, a constant time delay is used between successive stir pulses. A manual speed setting is used for configuring the blender apparatus to a slow stir function, the processor module is configured to control the blender motor to provide a sequence of pulsed operations 502 of the blades to a first target speed 504. Each pulse having a soft/slow start profile 506. During the stirring/blending operation, as the dynamic load provided by the ingredients in the blender jug change, the speed profile for the blender jug stir function can evolve over time.

By way of example, the processor module is configured to disable power upon reaching target speed 504 at a first time (at 510), and monitor the speed until the blades reach a predetermined minimum speed 512 at a second time (at 514). After a predetermined period 'Tw' (at 516), the processor module is configured to commence a subsequent pulse cycle. It will be appreciated that the predetermined period and/or predetermined speed can be zero.

It would be appreciated that the soft/slow start profile can also be dependent on the dynamic load provided by ingredients within the blender jug.

FIG. 22A shows, by way of example only, a speed profile 500 associated with a dynamic load of blending/stirring content increases over the stirring function—such that the predetermined minimum speed is reached more quickly over time. In this example, the rotation of the blades can stop for a period (at 518) before commencement of the next pulse.

FIG. 22B shows, by way of example only, a speed profile 501 associated with a dynamic load of blending/stirring content decreasing over the stirring function—such that the predetermined minimum speed is reached more slowly over time. In this example, the rotation speed of the blades may not reach zero/stationary (at 519) before commencement of the next pulse.

FIG. 22C shows, by way of example only, a speed profile 520, in which the time taken 521 from disabling power a first time (at 510) and reaching a predetermined minimum speed 512 at a second time (at 514) is used to predict a delay period 522. After the delay period 522, a next pulse commences. The predicted delay period, can be an estimated time for the blade speed to reach substantially zero (or some other predetermined speed).

The measurement of the time periods (521, 523 and 525) can each be used to calculate a respective delay periods (522, 524, 526). It will be appreciated that this can enable the processor module to compensate for changes in dynamic load during a stir function.

Alternatively, a single time period could be measured (e.g. 521) and all delay periods (522, 524, 526) are set equal. It will be appreciated that this can enable the processor module to at least compensate for the initial dynamic load of ingredient at the commencement of a stir function.

Figure 22D:
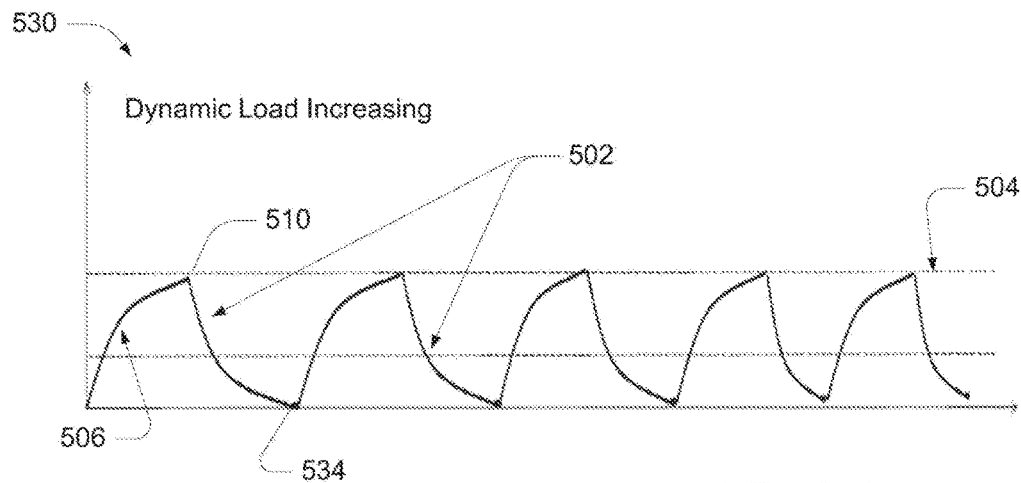
Figure 22E:
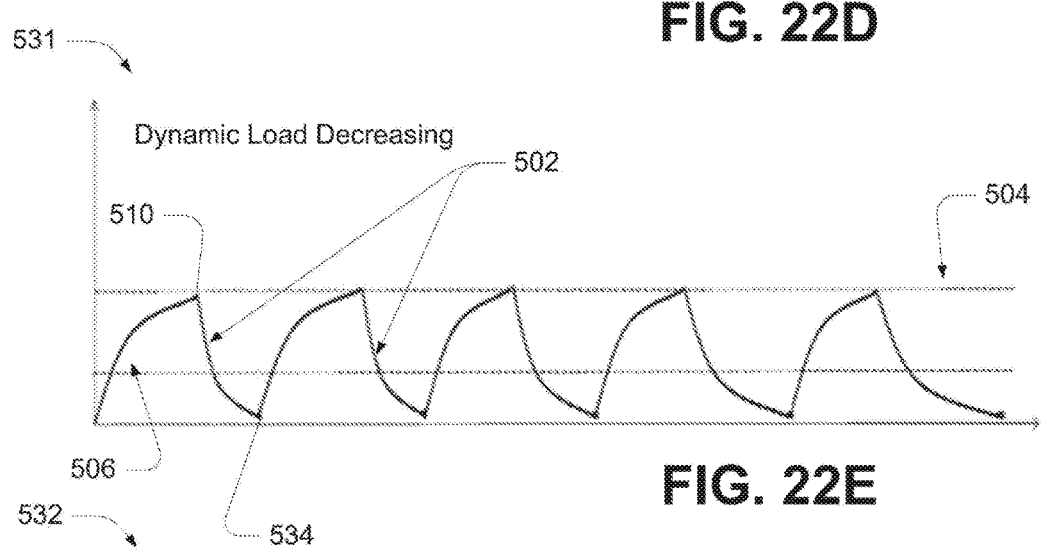
Figure 22F:
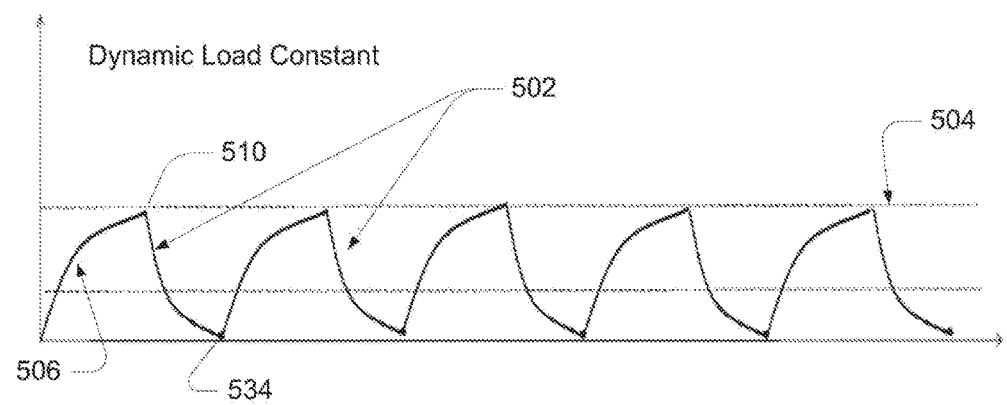

FIG. 22D though FIG. 22F show an example embodiment, represented by graphs 530/531/532, on which a predetermined speed detected and predetermined period are each zero. In these examples, the processor module can determine that the blade speed is about, or has reached, zero (at 534) and commences the next pulse. FIG. 22D shows a speed profile for ingredients that present an increasing dynamic load during the stir function. FIG. 22E shows a speed profile for ingredients that present an decreasing dynamic load during the stir function. FIG. 22F shows a speed profile for ingredients that present a substantially constant dynamic load during the stir function.

Figure 23:
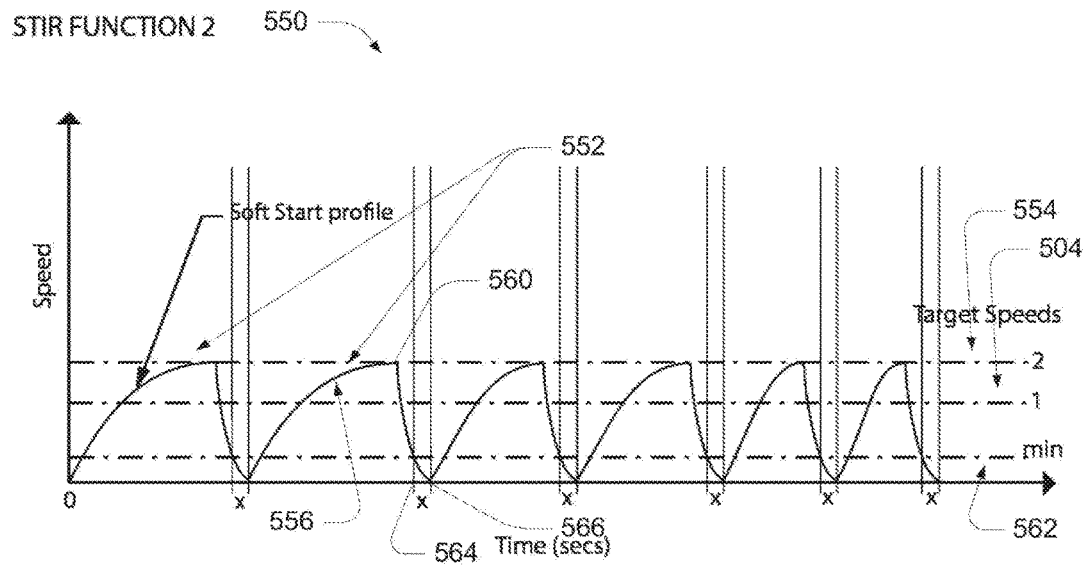
FIG. 23 is a line graph representing an embodiment speed profile for a stir function of a blender apparatus.

FIG. 23 shows, by way of example only, a line graph 550 representing an embodiment speed profile for a stir function of a blender apparatus.

In this example embodiment, a second stir function is shown in which the target speed 552 for this stir function is greater than the first target speed 502 (as defined in FIG. 22A).

In this example embodiment, using a second manual speed setting for configuring the blender apparatus to a fast stir function, the processor module is configured to control the blender motor to provide a sequence of pulsed operations 552 of the blades to a second target speed 554. Each pulse having a soft/slow start profile 556. During the stirring/blending operation, as the dynamic load provided by the ingredients in the blender jug change, the speed profile for the blender jug stir function evolve over time.

By way of example, the processor module is configured to disable power at a first time (at 560), and monitor the time taken for the blades to reach a predetermined minimum speed 562 (at 564). After a predetermined period ('X') (at 566), the processor module is configured to commence a subsequent pulse.

It would be appreciated that the soft/slow start profile can also be dependent on the dynamic load provided by ingredients within the blender jug.

Figure 24:
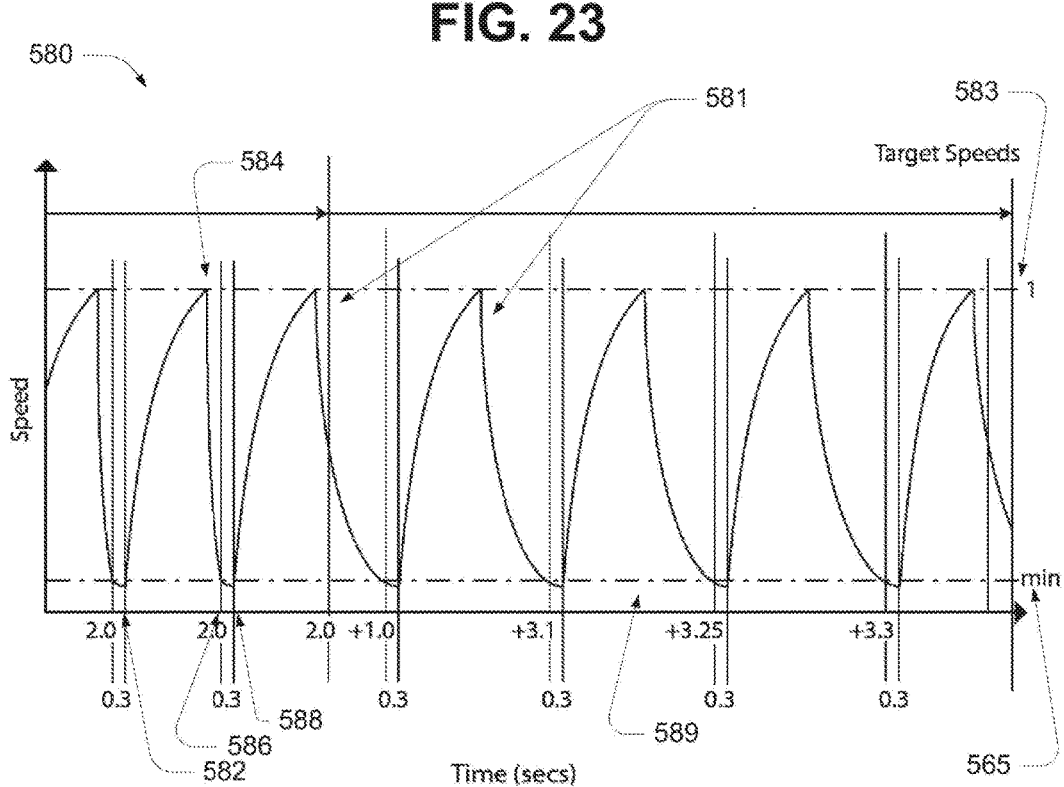
FIG. 24 is a line graph representing an embodiment speed profile for a ice crush function of a blender apparatus.

FIG. 24 shows a line graph 580 representing an embodiment speed profile for a ice crush function of a blender apparatus.

In this example embodiment, the speed profile 580 is a preset ice crush function, wherein the profile is monitored to identify completion of the ice crush function. In this example embodiment, an automatic completion detection module (element or means) monitors the blade speed profile 581 of consecutive pulse cycle of the blender apparatus to determine changes in viscosity/resistance imposed on the blades by the ice. It will be appreciated so that, resistance on the blades is decreased as the ice is crushed. This decrease in resistance causes the rate of deceleration of the blades through the crushed ice to slow causing the pulse period to lengthen.

In this example embodiment, an automatic completion detection module (element or means) measures the time from engaging the motor (e.g. at 582) for a predetermined period or reaching a maximum speed 583 (e.g. to 584). The processor module then disables the motor allowing the blades to slow.

The processor module monitors the blade/motor speed, and identifies when the speed drop to a minimum value 585 (e.g. to 586). In this example the time period is identified as 2.0 seconds.

The processor module, if proceed with a next pulse, can wait a predetermined period before re-activating the motor (e.g. at 588).

In subsequent pulses, as the ice is crushed, the rate of deceleration decreases and the pulse time period increases. For example, pulse 589 has a pulse period of 3.25. The processor module, by monitoring individual (or averaged) pulse periods, can identify pulse periods exceeding beyond a predetermined threshold—causing the ice crush function to be automatically terminated.

Figure 25:
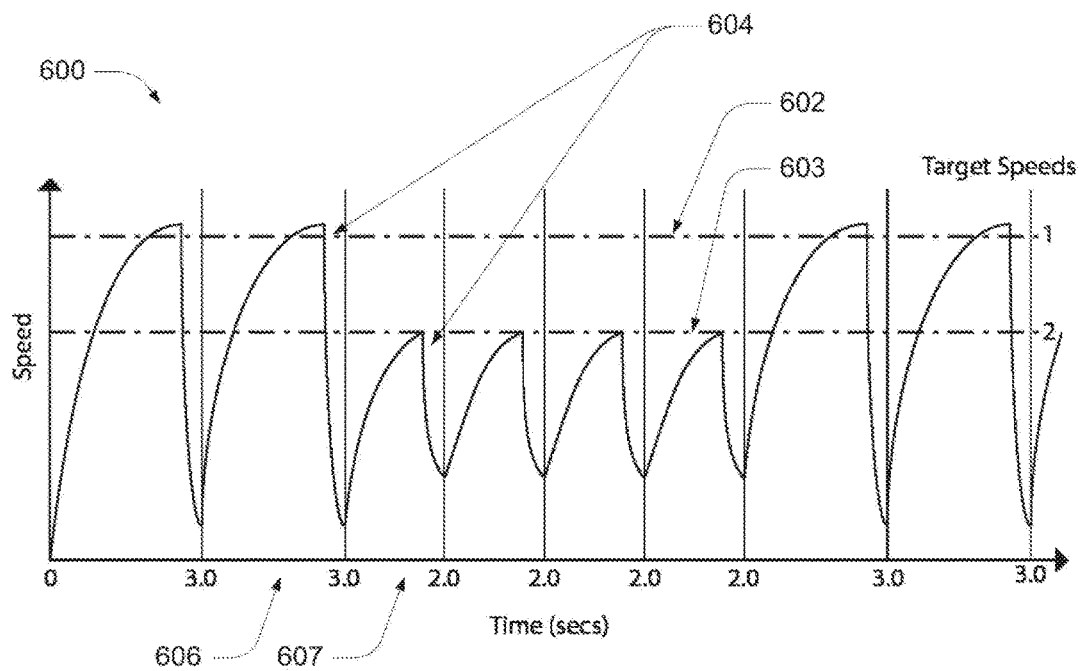
FIG. 25 is a line graph representing an embodiment speed profile for a smoothie function of a blender apparatus.

FIG. 25 shows a line graph 600 representing an embodiment speed profile for a smoothie function of a blender apparatus.

In this example embodiment speed profile 600, the processor module activates and deactivates the motor upon identifying the blade speed to one two predetermined speed values 602 and 603—each for a predetermined respective period—thereby causing a sequence of pulses 604. In this example the predetermined pulse period 606 for the maximum predetermined speed value 602 is longer than the predetermined pulse period 607 for the lower speed value 604.

Figure 26:
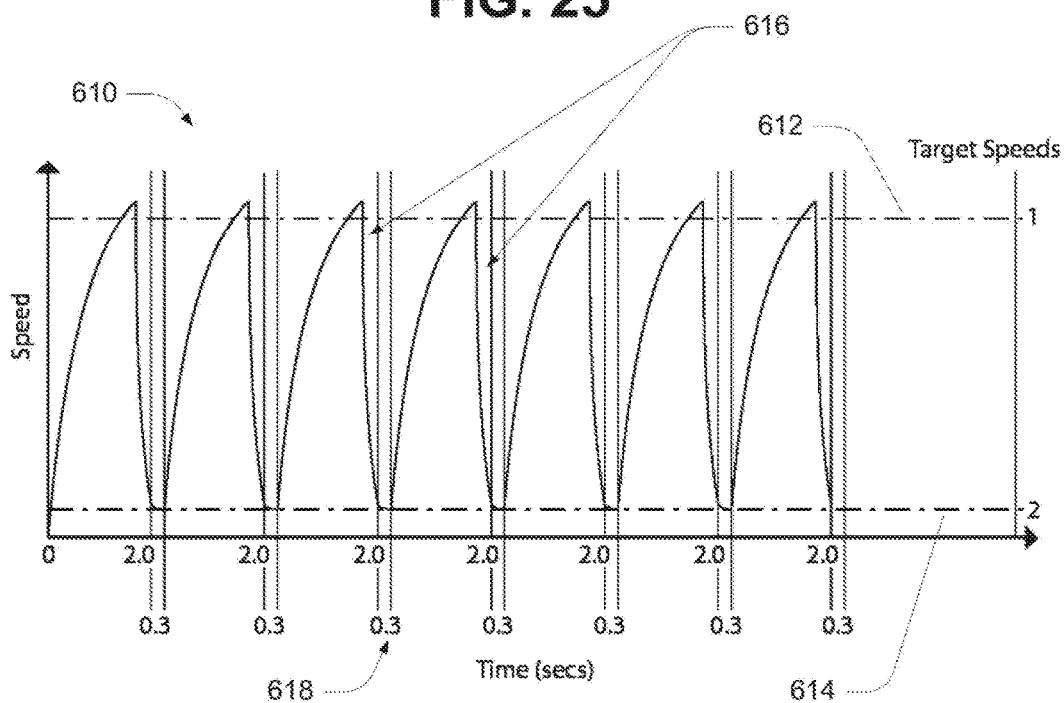
FIG. 26 is a line graph representing an embodiment speed profile for a ice crush function of a blender apparatus.

FIG. 26 shows a line graph 610 representing an embodiment speed profile for a ice crush function of a blender apparatus.

In this example embodiment speed profile 610, the processor module activates and deactivates the motor upon identifying the blade speed ranging between a maximum speed value 612 and minimum speed value 614—thereby causing a sequence of pulses 616. The pulses may be separated by a predetermined period 618.

Figure 27:
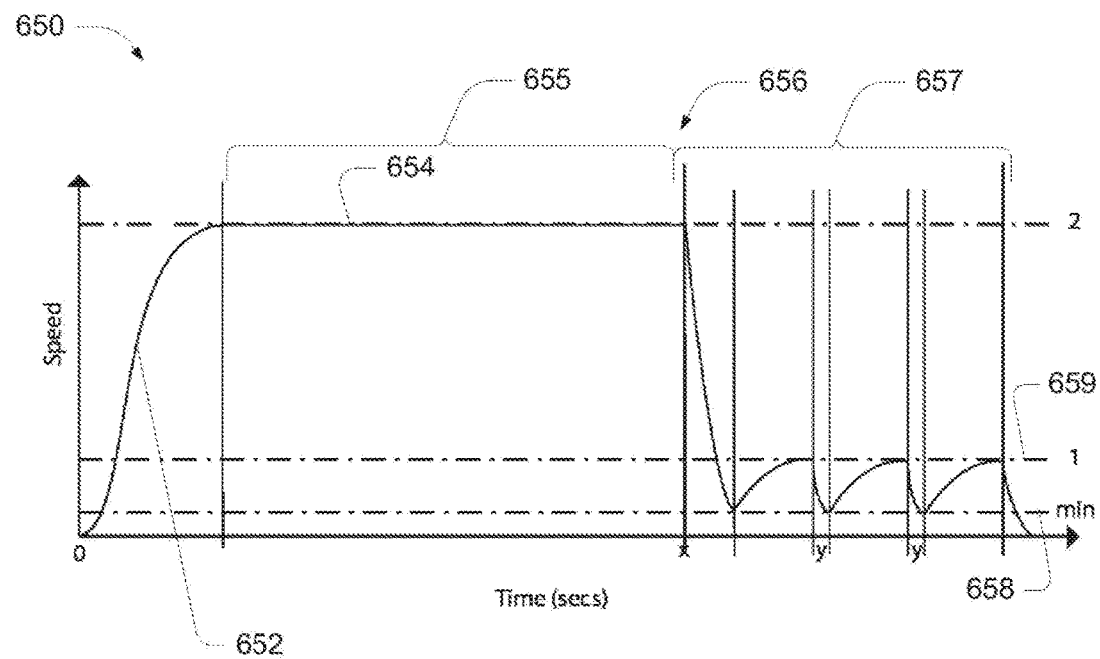
FIG. 27 shows a line graph representing an embodiment speed profile for a hot soup function of a blender apparatus.

FIG. 27 shows a line graph 650 representing an embodiment speed profile for a hot soup function of a blender apparatus.

In this example embodiment speed profile 650, a processor module controls (activates, speed controls, power controls, and/or deactivates) the motor. The speed profile 650 commences with a soft start profile 652 and proceeds to a target speed 654. The soft start profile assists in reducing the amount of ingredients and liquid forced upward toward a lid. A time duration 655 for operating the blade at the target speed can be preset and/or predefined. Alternatively, the time duration 655 for operating the blade at the target speed can be limited by a measure of resistance imposed on the blades by the ingredients, indicating that the ingredient thickness (or viscosity) has reached a predetermined value or level. At the conclusion of the time period for operating the blades at a target speed (at 656), the processor module causes the blades to enter a second phase (for example anti-cavitations phase) 657. In this second phase 657, the blades are cycled (or pulsed) between a minimum lower target speed 658 and an upper target speed 659. The duration of the second phase 657 can be predetermined based on a preconfigured time period or predetermined number of cycles. It will be appreciated that the second phase stirs the ingredient mixture for aiding the collapse of air pockets (or steam pockets) that may be trapped between (or within) the viscous liquid. It will be further appreciated that, by removing air pockets (or steam pockets) within the liquid soup, there is a reduced risk of the liquid bubbling at the surface.

Blender Lid Apparatus

Figure 28:
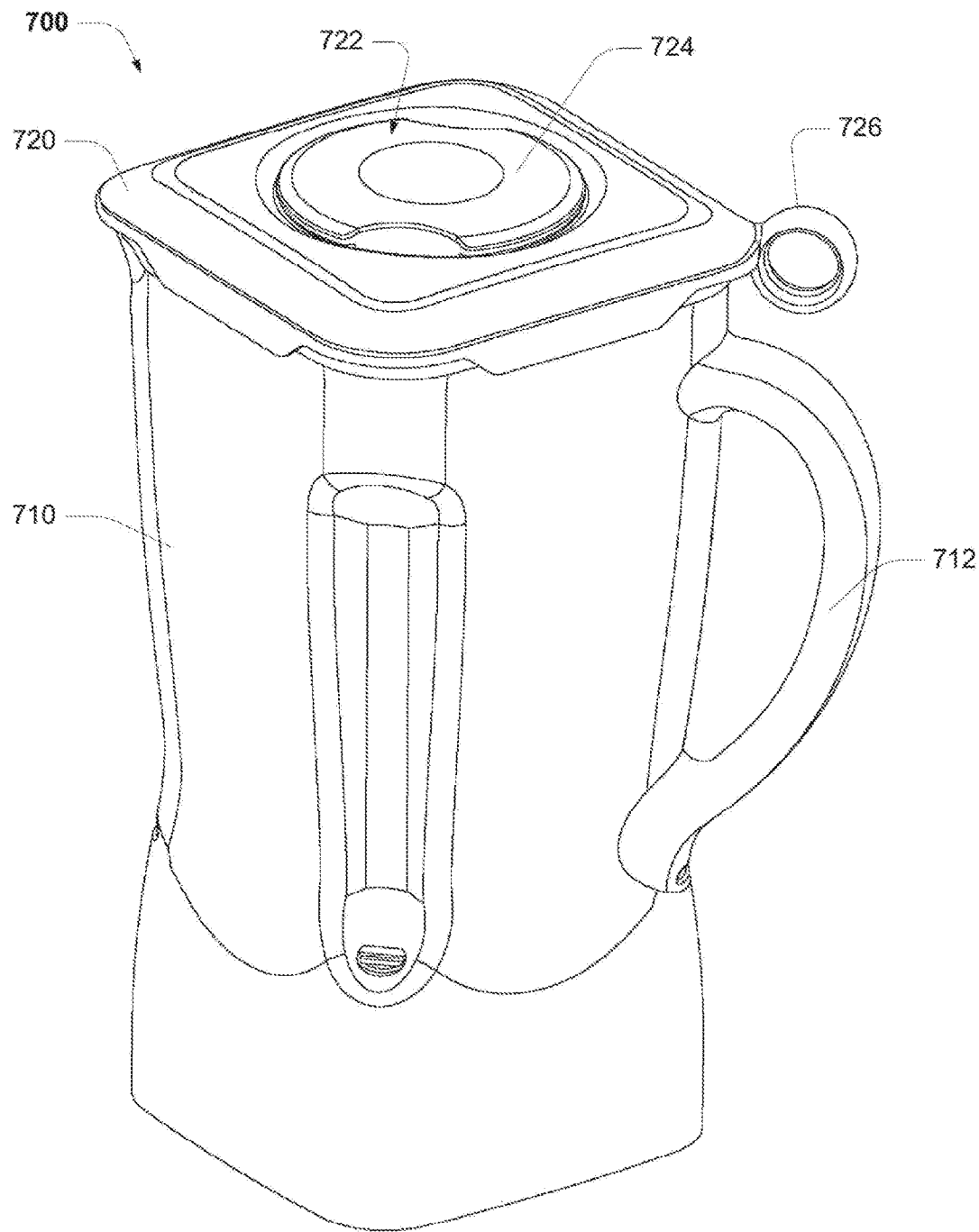
FIG. 28 shows an embodiment removable jug assembly for a blender apparatus.

FIG. 28 shows an embodiment removable jug assembly 700 for a blender apparatus.

In this example embodiment jug assembly 700 includes a jug 710 having a removable lid 720. Typically, the jug 710 has a handle 712, for example located about the corner of a square jug. The removable lid 720, has a through aperture 722 and a plug element 724. By way of example, the lid 720 also has a handle ring element 726 to assist with removal of the lid from the jug.

FIG. 29 through FIG. 32 show aspects of an example embodiment lid 720.

In this embodiment, the lid 720 includes a plurality of flexible rib flanges 730 for abutting and sealing against an inner surface 711 of a jug 710. The lid further includes an outwardly extending capping flange 732 that abuts an upper perimeter 712 of the jug 710. The lid further includes a plurality of downwardly extending lid clamp elements 734 are located about the perimeter of the cap for engaging a cooperating rim ledge 714 about the upper-outer surface of the jug 710.

Figure 33:
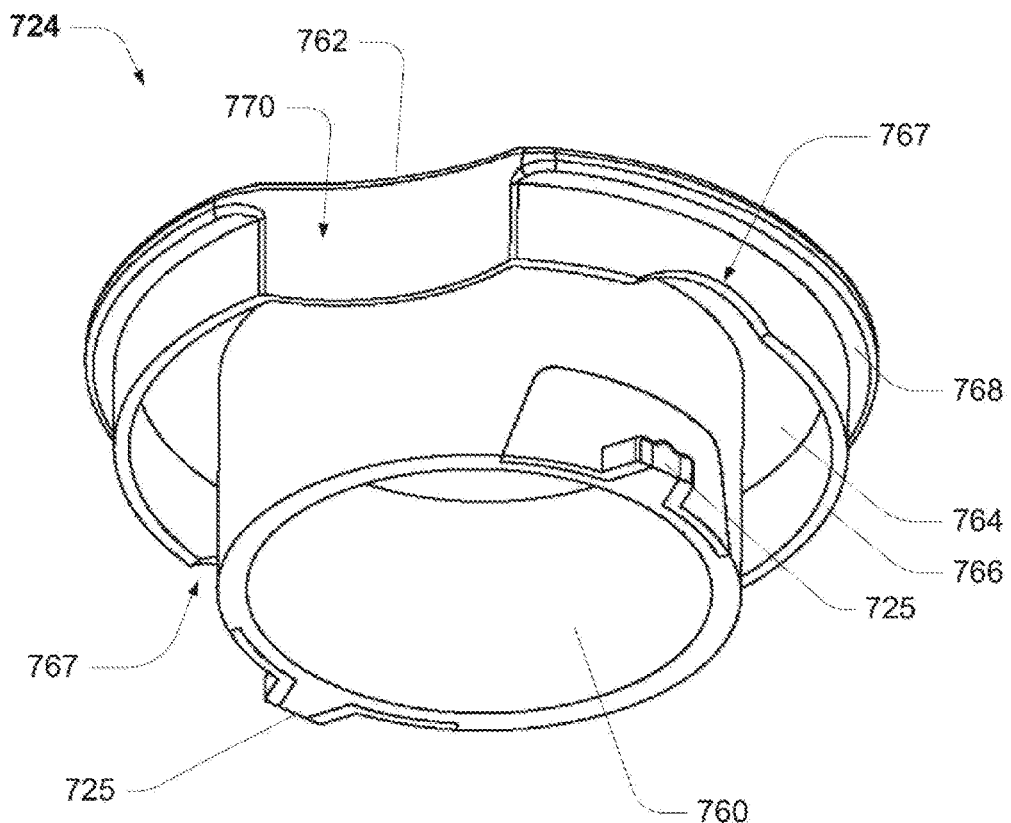
FIG. 33 shows an example embodiment filler plug element.

The through aperture 722 if the lid 720 includes axially directed recesses 723 about the periphery of the aperture for receiving corresponding guide elements 725 of the plug element 724 (as shown in FIG. 33). The recess 723 cooperate with the guide element 725 to provide a bayonet coupling for releasably retaining the plug element in the lid.

Figure 30:
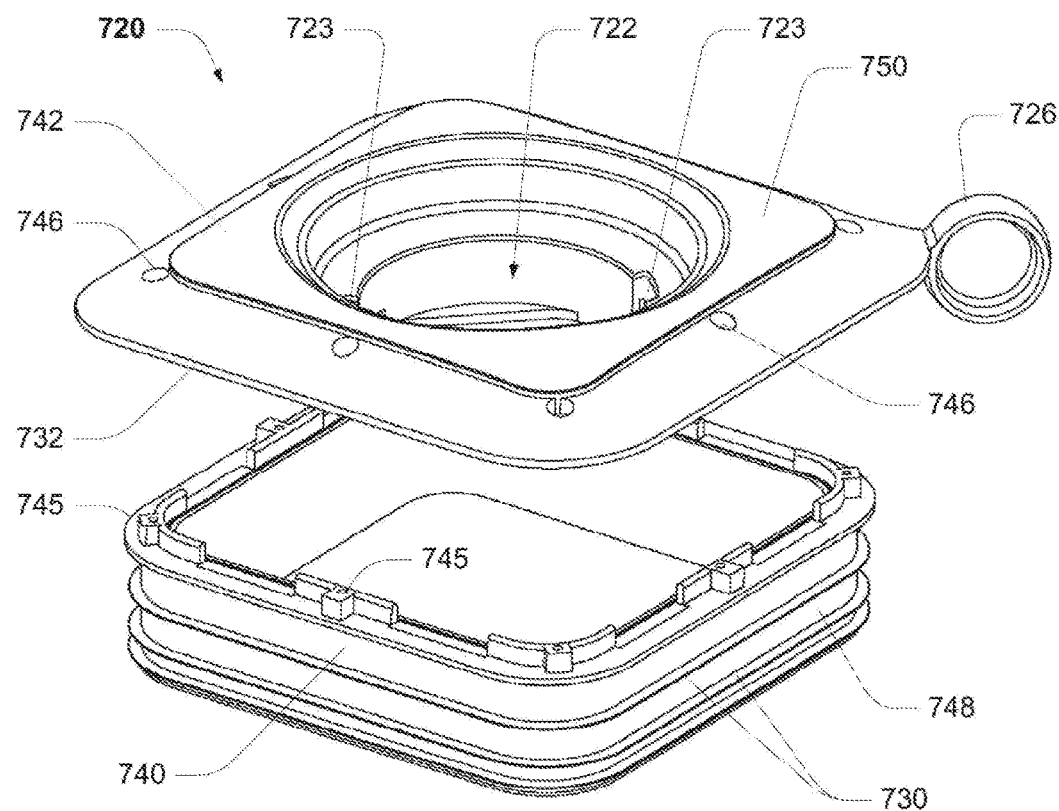
FIG. 30 shows an inline for assembly view of the lid of FIG. 29.
Figure 31:
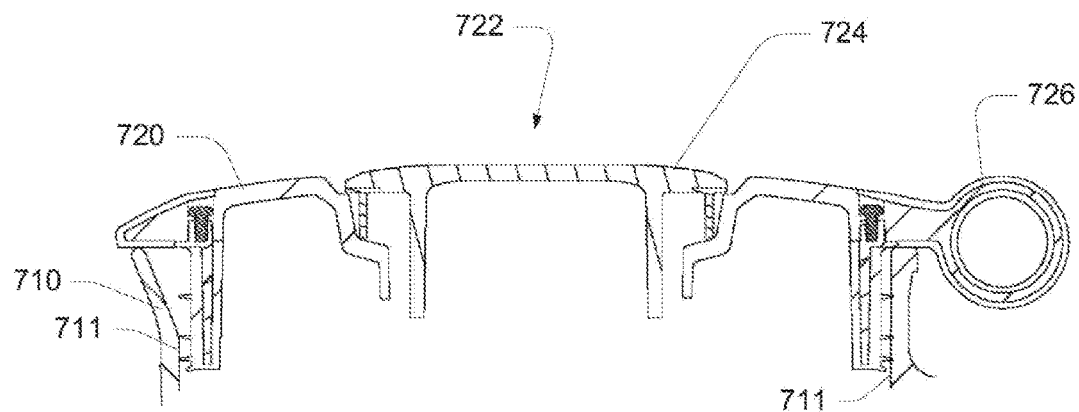
FIG. 31 shows an sectional view of the lid of FIG. 29.
Figure 32:
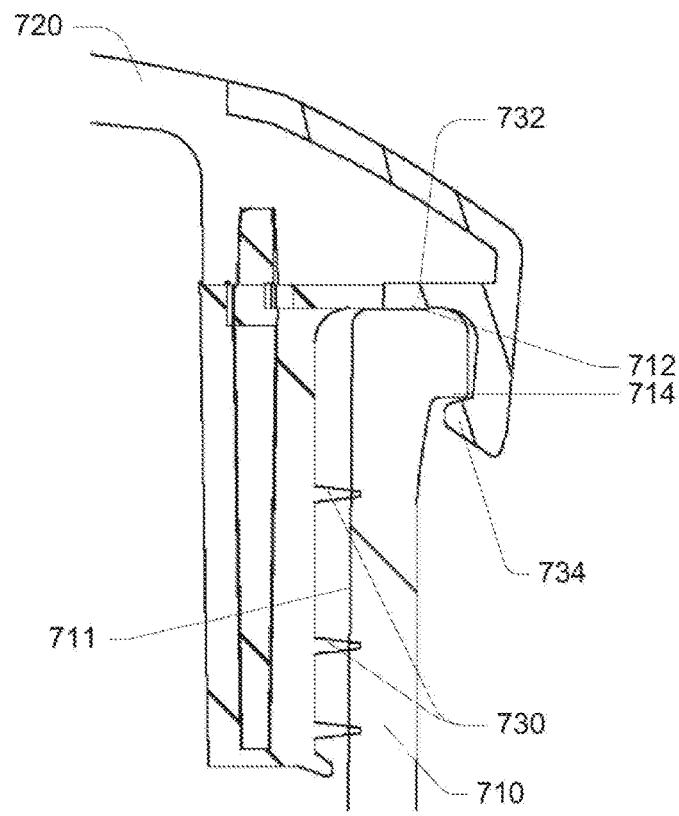
FIG. 32 shows an enlarged partial sectional view of the lid of FIG. 29.

FIG. 30 shows an inline for assembly view of the lid element 720. By way of example only, an embodiment lid element 720 can comprise an inner frame portion 740 and an upper frame portion 742. The inner frame portion and the upper lid portion can be coupled (for example at 745, 746). By way of example, coupling can be by way of screw coupling, heat staked coupling, ultrasonic weld coupling or other bonding methods.

By way of example only, the inner frame portion 740 can be constructed from a polyalymide or other high temperature polymer. The inner frame portion can be further over moulded with a silicone seal portion 748, which further comprise the flange rib elements 730.

Figure 29:
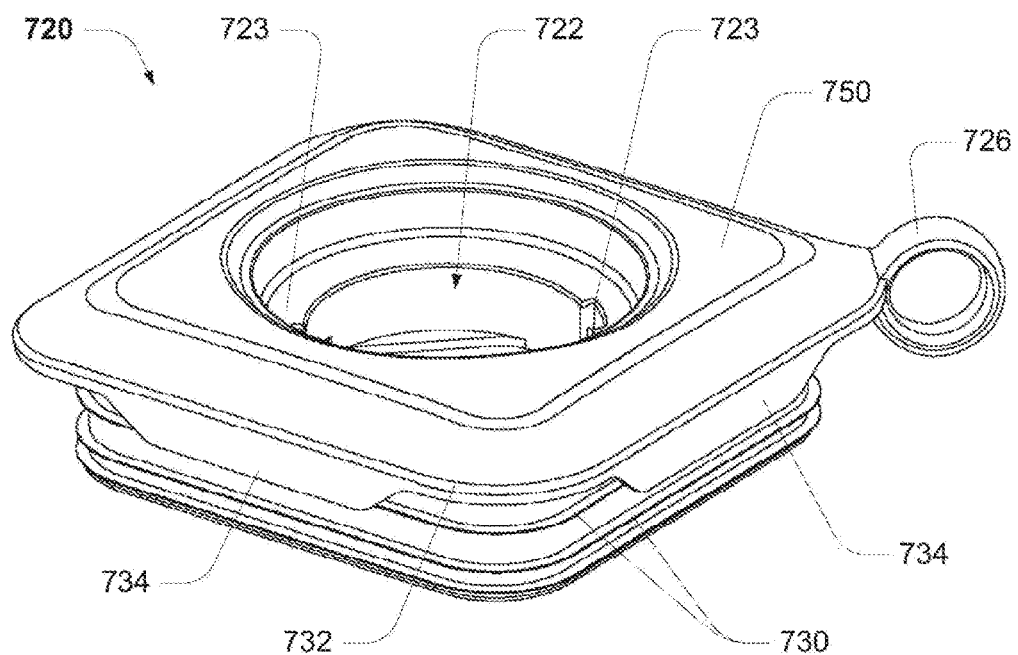
FIG. 29 shows an example embodiment lid for a jug assembly.

By way of example only, the upper frame portion 742 can be constructed of a clear polymer, for providing a viewing window 750 through to the jug contents. The upper frame portion can be further over moulded with an elastomer product (typically a soft elastomer) This over moulding covers the fixing/coupling elements between the inner frame portion and the upper frame portion, for forming the final lid (as shown in FIG. 29).

Figure 34:
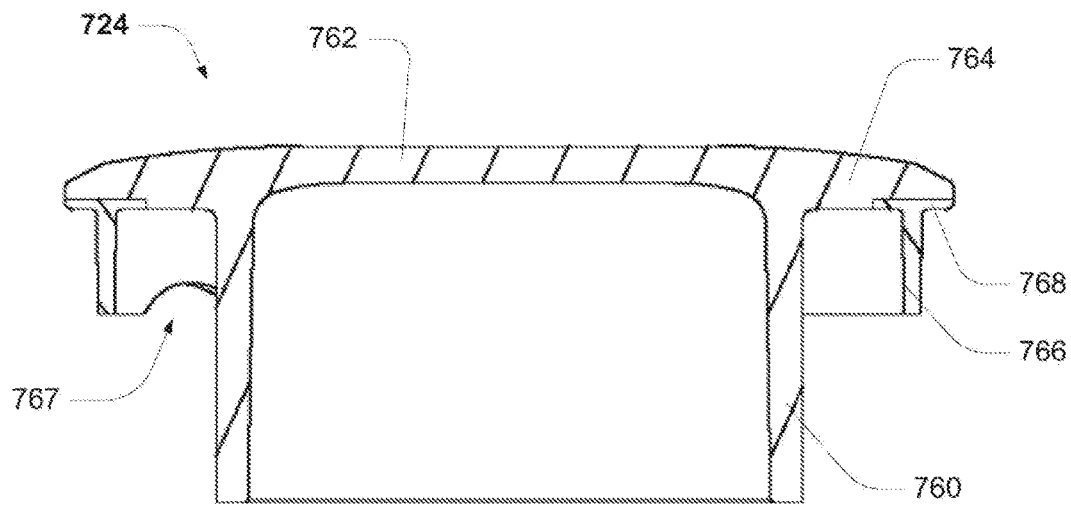
FIG. 34 shows a sectional view of the plug element of FIG. 33.
Figure 35:
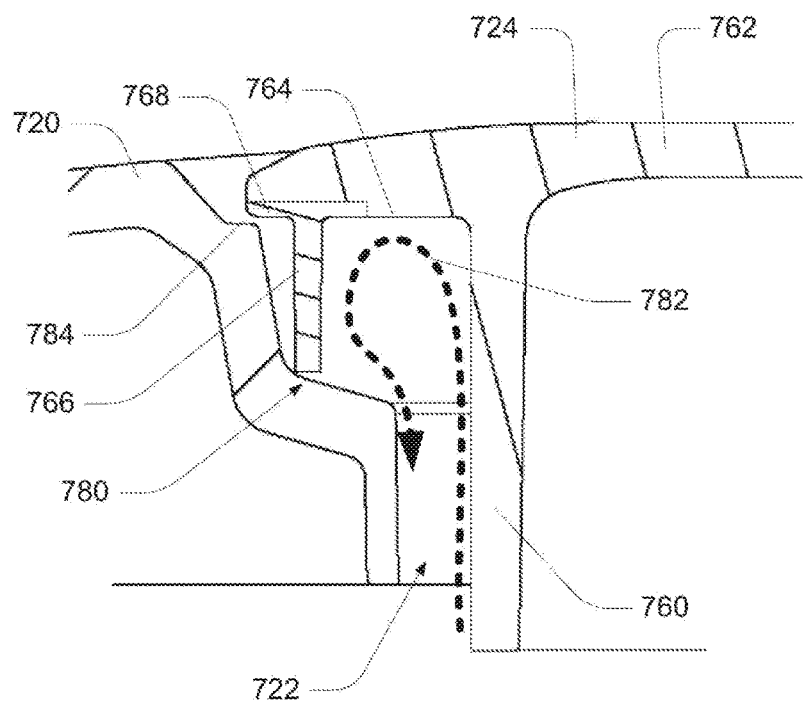
FIG. 35 shows an enlarged partial sectional view of the plug element of FIG. 33, shown located within an aperture of a lid.

FIG. 33 through FIG. 35 shown an example embodiment filler plug (or cap) element 724.

This plug element 724 comprises a cylindrical body portion 760 that is sized to fit within a lid aperture 722, and support guide elements 725. A capping portion 762 extends over, and past the plug body portion 760 to define an outwardly directed circumferential flange 764. The outwardly directed circumferential flange 764 further carries a downwardly directed skirt element 766. The skirt element 766 includes one or more steam release recesses 767. By way of example, the skirt element 766 can be separately moulded from an elastomer or polymeric material.

Typically the flange 764 extends past the skirt element 766 to define an extended umbrella flange portion 768.

In this example embodiment, one or more scalloped recesses 770 are provided about the perimeter of the plug element 724, to thereby define respective user grip portions.

FIG. 35 shows an enlarged partial sectional view of the plug element located within an aperture or recess 722 refined by a lid 720.

In this example embodiment, the skirt 766 engages an inwardly directed abutment surface 780 defined within the aperture 722 of the lid 720. It will be appreciated that ingredients or fluid directed through the aperture 722 past the plug body portion 760 is redirected by the flange 764 and skirt 766 to substantially have a return flow path 782. The steam release recesses 767 define a steam release aperture between the skirt 766 and the abutment surface 780. By recessing the abutment surface within the lid, ingredients or fluid that flows through the steam release aperture can be further retained by the recessed aperture, and redirected (typically via gravity) back towards the jug. This can be further enhanced by the extended umbrella flange 768 being located proximal to so (and typically partially overlapping) a ridge 784 located within the aperture 722.

It will be appreciated that, with the plug element 724 removed, ingredients and objects can be placed through the aperture 722.

Figure 36:
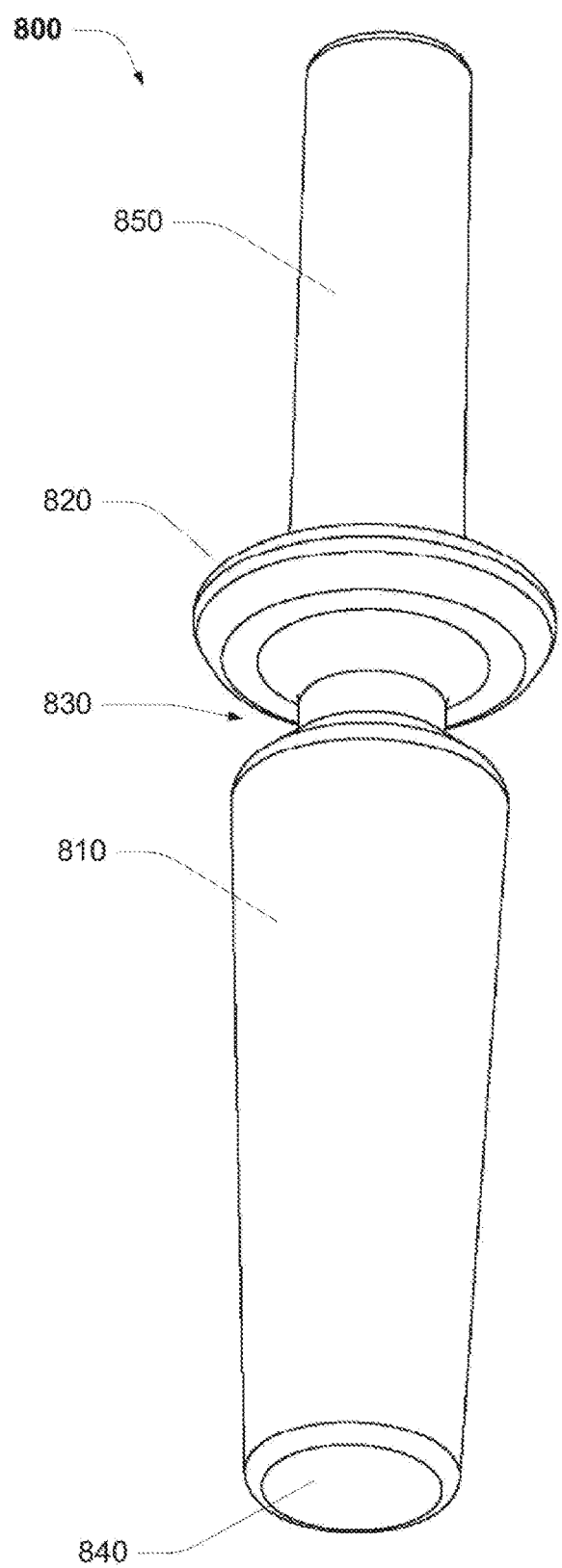
FIG. 36 shows an embodiment tamper device for use through an aperture in a lid of a blender apparatus.

FIG. 36 shows an embodiment tamper device 800 for use through an aperture in a lid of a blender apparatus.

In this example embodiment, the tamper element 800 includes an elongated body 810, for example a substantially cylindrical body 810. The tamper element 800 further includes a guard element 820 for restricting full insertion of the body 810 through an aperture in the lid. The guard element being typically in the form of a radially extending guard flange 820. The body 810 can further define a waisted portion 830 below the guard flange for enabling (or enhancing) pivoting of the body 810 within the aperture in a lid. The body can include a concave tamping surface 840 at a lower end. The tamper device typically defines a handle 850 at an upper end.

Figure 37:
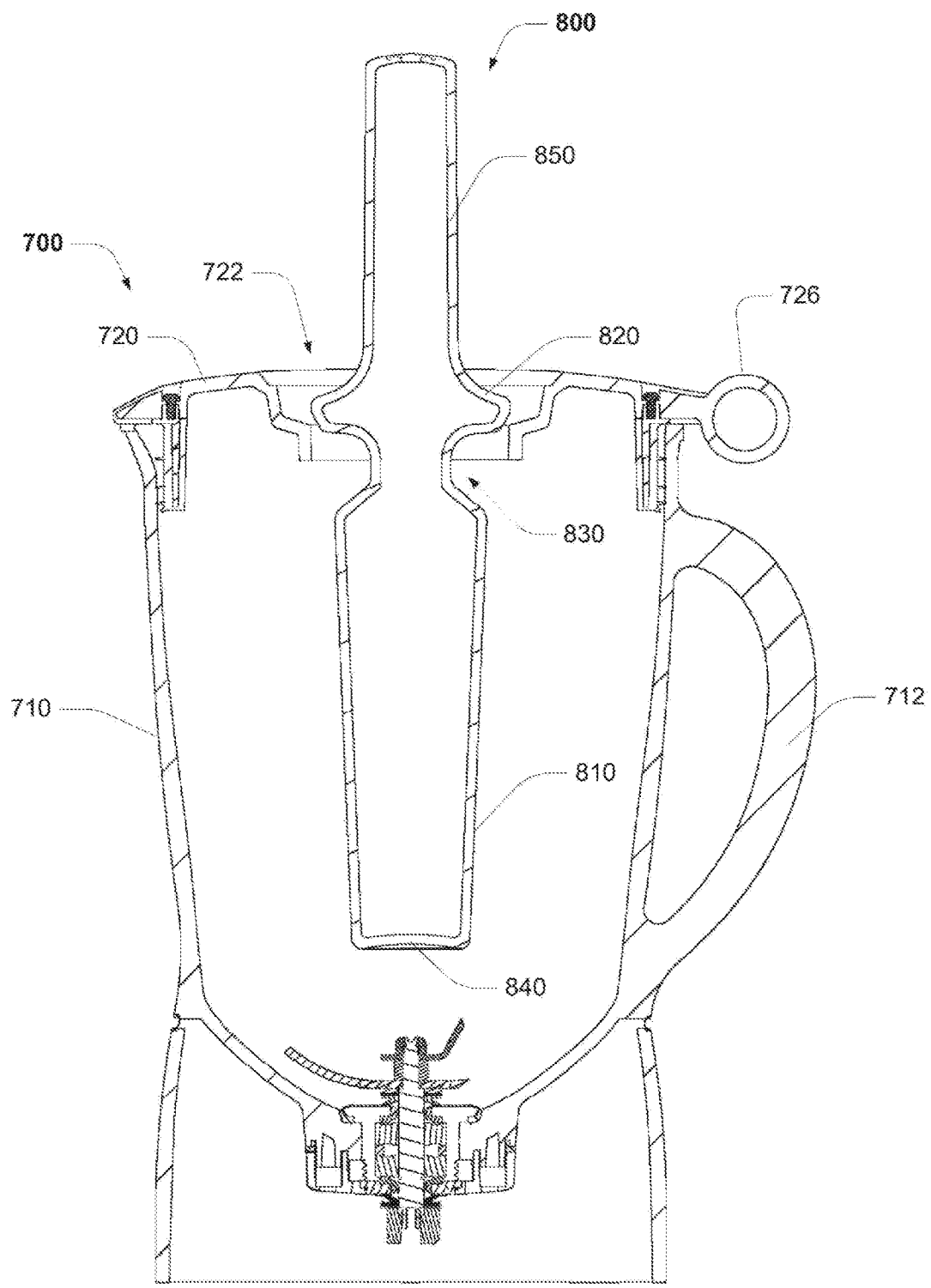
FIG. 37 shows an embodiment tamper device of FIG. 36, shown in use through an aperture in a lid of a blender apparatus.

It will be appreciated that the length of the tamper element 800 below the guard 820 is sized to prohibit engagement of the tamper device with the blender blades, when located in the through aperture of the lid (as best shown in FIG. 37).

Figure 38:
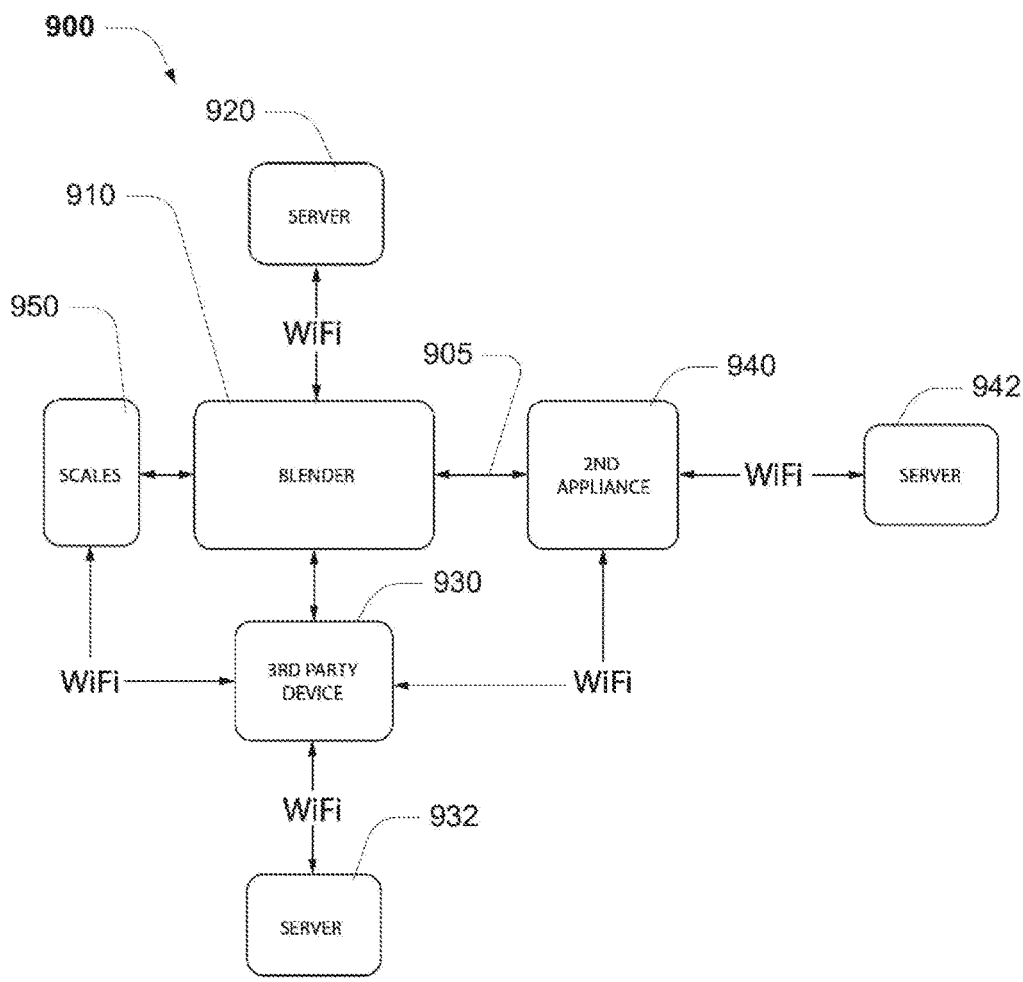
FIG. 38 shows an embodiment configuration for a blender communicating within a wireless environment.

FIG. 38 shows an embodiment configuration 900 in which a blender 910 communicates within a wireless environment to other devices.

The blender 910 can act as a primary device, whereby a number of external/portable devices can connect to it through various communication mediums (for example a wireless communication or near field communication) By way of example only, a wireless communication can include WiFi and a near field communication can include Bluetooth.

By way of example, external/portable devices can include any one or more of the following:

- a base server device 920 coupled to the communication medium that can act as a home or base device that outputs data/information to a connected appliances (for example, a blender or oven)—wherein data can also be retrieved once outputted base server to recall information such as software updates, recipes, troubleshoot information;
- a third party device 930 (for example smart phone device, tablet device or the like) coupled to the communication mediums can include a number of portable devices that, when connected to a primary device, can communicate through the communication mediums, and which may also communicate with a data server 932;
- a second appliance 940 is coupled to the communication mediums, and can enable intercommunication between devices for sharing data/information, and which may also communicate with a data server 942; and
- a third appliance 950, such as a scales appliance, is coupled to the communication mediums, and can enable intercommunication between devices or appliances for sharing data/information.

Advantages of this interconnectivity between devices and appliances can include any one or more of the following:

- scales appliances can wirelessly communicate with either a controller of a blender or a third party device—providing weight information to be used by the blender to set a speed or power level or blend function or blend time; or suggest recipe portioning;
- a third party device can communicate with a blender to upload new blending profiles or to update existing ones;
- a third party device can communicate with a blender to provide operating instructions such as food type, blending task, speed and time, power and time, frozen or fresh;
- a blender can communicate with a third party device to receive user feedback on the blending progress of the food/beverage item, which may include speed or power, time remaining;
- a blender can communicate with a third party device to enable the device to make real time amendments to the blending profile—for example, depending on the progress of the blending cycle, modifying blending speed or power, and/or blending function and/or blending time;
- a blender can communicate with other appliances—for example to instruct commencement of blending, or advice of blending completion, the blender can communicate to an appliance to perform a different task to enable a meal preparation to finish at a specific end time;
- a blender can communicate back to a server (for example a service department of the company that produces the product) to: provide feedback on performance, help resolve troubleshoot problems raised by a consumer;
- a blender can communicate to a third party device to provide an alert for an identified problem;
- a blender can communicate with an appliance or device to remotely present a predetermined screen layout, thereby providing a shared interface between appliances;
- a blender can communicate with a device to enable re-programming of button key functions.

It will be appreciated that connectivity between a blender and another appliance can assist in situations, by way of example only, where a recipe calls for juice to be made in a juicer and/or certain amount of ingredient weighed on connected scales, the appliances can communicate and instruct the user through steps of a recipe.

It will be appreciated that connectivity between a blender and mobile computing device (e.g. tablet) to display and control functions of the blender. The computing device can present a more sophisticated interface than which is not present on the blender unit.

Figure 39:
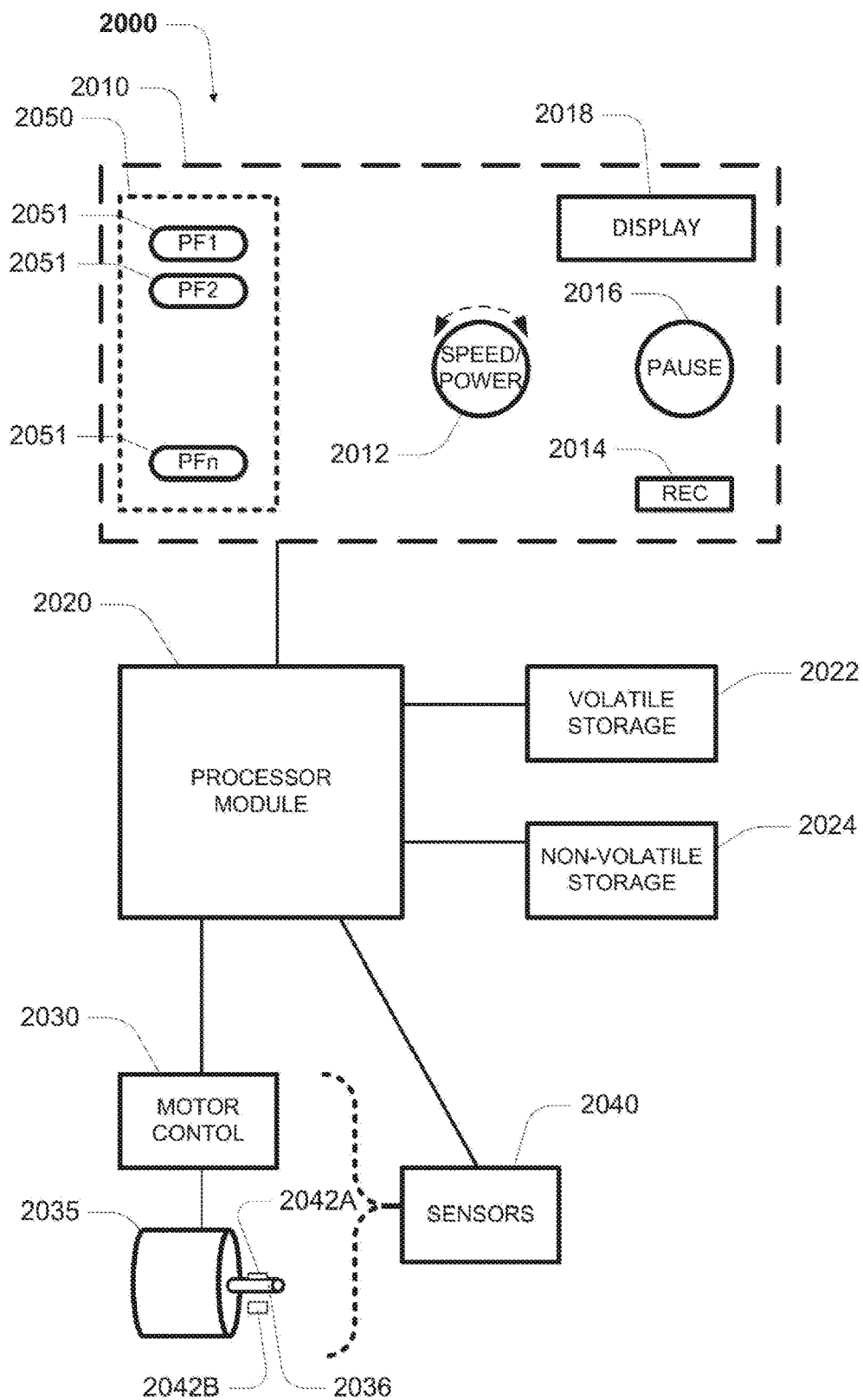
FIG. 39 shows a schematic diagram of an embodiment appliance for recording and playback of a custom operating sequence.

FIG. 39 shows an embodiment apparatus (or appliance) 2000. The apparatus 2000 includes a user interface 2010 that is coupled to a processor 2020 for receiving user input to control operation of the apparatus or appliance.

In this example, the appliance is a blender, and the processor module is coupled to a motor controller 2030 for controlling power applied to (or setting speed of) a motor 2035. The processor module is also coupled to a system memory 2022 that is typically a volatile storage medium (for example, random access memory—DRAM or SRAM), and a configuration or parameter memory 2024 that is typically a non-volatile storage medium (for example read only memory ROM, electronically programmable read only memory EPROM, electronically erasable read only memory EEPROM, flash memory FLASH, etc). The non-volatile storage medium can be integrated with the apparatus or removable.

In this example embodiment, the user interface 2010 includes a motor speed or power selector 2012 for allowing the user to input a desired motor speed or power. A signal or data indicative of the user selected power or speed is received by the processor module. The speed or power selector element 2012 can be in the form of: a multi-state selector or switch having a discrete number of selection or states; or a continuously variable speed or power selector having a range from zero to maximum speed or power. It would be appreciated that the speed or power selector element can be in the form of a rotary dial, slider, sequence of selector buttons, presented as a graphical interface with touch screen input, or the like.

The user interface 2010 can also include a record selector element or button 2014, for example a button or menu selection, for configuring the processor module to record a customised sequence of user inputs, for subsequent storing to a configuration memory.

The user interface 2010 can also include a pause selector element 2016 (for example, as previously discussed), which can be used to pause a pre-recorded customised sequences or a selected factory pre-configured functions. Activation or selection of the pause input element can also be recorded by the processor module when recording a customised user input sequence. When recording a user input sequence, the processor module further records the subsequent return operation after a pause selection, such as by recording the next user input such as resume, pre-set function selection resumed, manual speed or power settings, or new pre-set function selection.

The user interface 2010 can also include a display element 2018 for presenting data indicative of user selection or status of the apparatus.

By way of example only, the processor 2020 may also be coupled to one or more sensor elements 2040 for enabling the processor module to monitor or receive feedback of data indicative of parameters associated with the motor, including any one or more of: motor speed, motor torque, or power applied to the motor. It will be appreciated that sensors are used in performing some pre-set or pre-configured function as described herein.

As previously discussed, an embodiment apparatus may be adapted to perform one or more pre-set, pre-defined or pre-configured functions, which can be selected through the user interface function selectors 2050. The function selection options are typically presented by way of distinct function selection elements or buttons 2051, but may be incorporated into a menu selection or selected by another selection means. It will be appreciated that the pre-set functions provided may include any of those discussed herein, and are controlled or performed by the processor module to provide a predetermined sequence which may be paused and resumed or restarted at any time. It would be further appreciated that the pre-set functions can incorporate feedback monitoring by the processor module for enabling an event driven function, which is typically not possible through user input of a speed or power selection element alone.

The processor module can record user input speed or power selections over a period of time, which can be saved as a custom sequence indicative of the user input time-speed/power profile for later replay. By way of example, the processor module may time sample the user input speed or power selection to provide discreet time sequence of any user input selection. It would be appreciated that this sequence of user input selection can be recorded in many ways, for example a time sequence having known time steps, a time sequence having variable time steps or durations, or any other compressed form suitable for recreating a time-speed profile. The user input speed or power selection may also be quantised to a predetermined number of speed/power levels or ranges.

A predefined recording limit may be imposed on any custom sequence. A predefined recording limit may be imposed to avoid continuous operation of the motor for an extended period of time. The display 2018 may present a countdown timer showing the time remaining for recording, this may exclude any paused period in the recording.

At the completion of recording a custom sequence, the recorded sequence of user inputs are typically maintained in a system memory 2022 which is then copied to a non-volatile storage 2024 as a custom sequence that may be recalled or read for replay. It would be appreciated that in alternative embodiments, the processor module may post-process the recorded sequence, for example compressing the data. For example the data may be compressed by quantising the user input speed or power selection and/or utilising non uniform time steps when recording the custom sequence. For example, the manual user input speed or power selection may be quantised into a lower number of speed/power ranges and/or the sequence records the quantised power selected and the duration over which the input was maintained constant, such that a user input speed or power time profile may be reconstructed from the compressed data sequence.

In an embodiment, by way of example only, a kitchen appliance or blender appliance may include:
  a processor module, coupled to a non-volatile storage medium for storing a custom sequences;
  a user interface having a speed or power selection element and a record selector;
  a motor controller coupled to a blender motor, the processor module coupled to the motor controller for controlling operation of the motor according to user input selections;
  wherein upon user selection of the record selector, the processor module enters a record mode and records a sequence of user inputs made through the user interface; and upon completion of the record mode, the processor module saves a custom sequence indicative of the recorded sequence to the non-volatile storage medium for subsequent playback.

The processor module records a time sampled sequence of a user input speed or power selection element. Alternatively, the processor module may record changes in a user input selection element, for example by way of recording a speed or power value and duration.

It would be appreciated that the speed or power selector can be used to enable a user to input a relative input between a minimum and maximum operating parameters (such as applied power or speed for a motor) for an appliance.

In an example embodiment, a speed can be selected by a user using the speed selector 2012, it may be a relative speed between a minimum speed and a maximum speed as available through a motor controller 2030, the processor can receive feedback of the actual motor rotational speed for controlling or regulating the motor 2035 to a set speed as indicated by the speed selector. This provides a control loop to regulate rotational speed of the motor as indicated by the user input speed selection, substantially unrelated to (or irrespective of) the applied load. By way of example, motor rotational speed can be measured or monitored using a magnet 2042A located on the rotating shaft 2036 of the motor 2035 and a sensor 2040 being a hall effect sensor 2042B located proximal to the shaft, such that the hall effect sensor is coupled to the processor to provide a signal indicative of motor rotational speed.

In an example embodiment, a power can be selected by a user using the power selector 2012, it may be a relative power between a minimum power and a maximum power as available through a motor controller 2030, the processor can receive feedback of the actual motor power for controlling or regulating the motor 2035 to a set power as indicated by the speed selector. This provides a control loop to regulate power of the motor as indicated by the user input power selection, substantially unrelated to (or irrespective of) the applied load. By way of example, motor rotational speed can be measured or monitored using a sensor 2040 for measuring current applied to the motor or strain applied to the motor.

The user interface can further include a pause selector. When the processor module is in the record mode, and a user selects the pause selector, the processor records the pause selection in the sequence of user inputs.

The processor module can be adapted to perform one or more pre-set functions, and the user interface further includes one or more pre-set function selector elements. When the processor module is in the record mode, and a user selects a pre-set function, the processor records the pre-set function in the sequence of user inputs and the duration that the user operated the pre-set function. When the processor module is performing a pre-set function, and a user selects the pause selector, the processor records the duration that the user operated the pre-set function and the pause selection in the sequence of user inputs. After the pause, the pause pre-set function can be resumed or another operation selected by the user. If the pre-set function is resumed, the processor module records pre-set function, flagged as a resumption, and the subsequent resumed duration that the user operated the pre-set function. If another operation selected by the user, the processor module records the user input as a new item in the sequence.

The processor module, typically initially records the user input sequence in a volatile system memory.

The apparatus further includes one or more sensors coupled to the processor module; the processor module being adapted to receive a signal or data indicative of the motor operation.

The user interface can further includes a display element. The display element can present a countdown timer, indicative of time available in recording a sequence.

Figure 40:
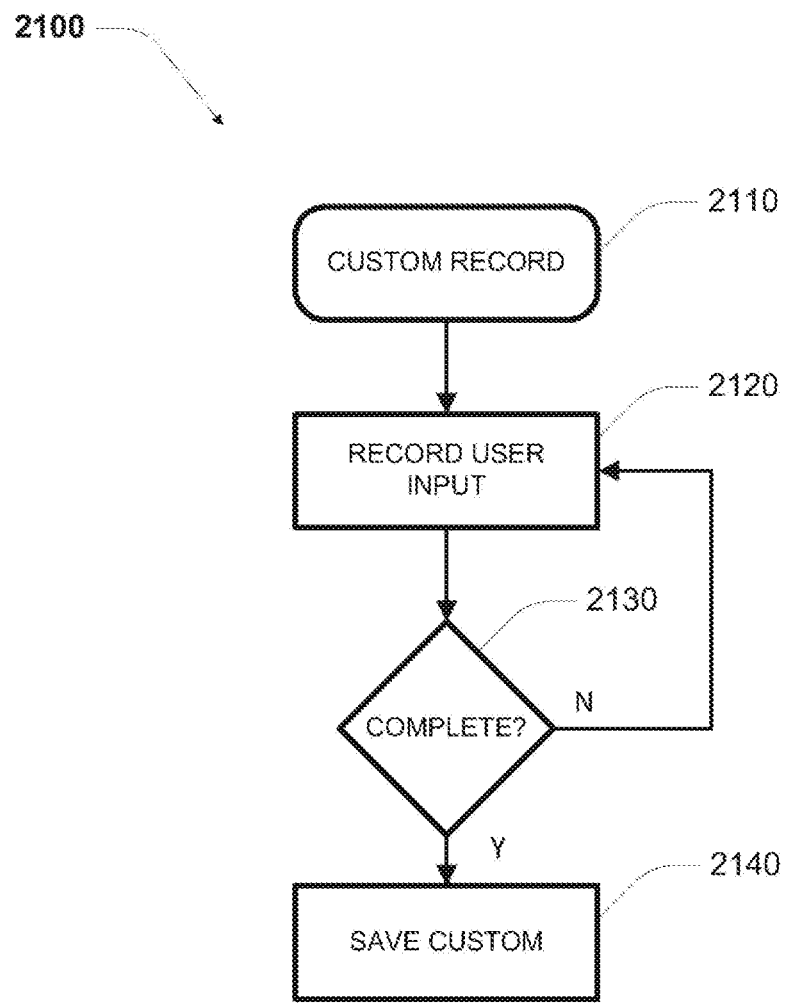
FIG. 40 shows a flowchart of an embodiment method of for recording a custom operating sequence of an appliance.

FIG. 40 shows an embodiment method 2100 of providing a custom record feature in an appliance.

In this embodiment, the appliance is placed in a custom record mode 2010 (for example by selection of a user input of a record selector). In the custom record so mode, the appliance records user input for a period of time.

The processor module monitors the user interface and records the user inputs 2120. Typically, sufficient data indicative of each user input is recorded to enable playback of the sequence. User input may include user input (or change) of a manual speed or power setting, user selection of a pause/resume, or user selection of a pre-programmed function. In the custom record mode, the user interface operates as normal. In the custom record mode the manual speed or power selection can be used to override any current speed or power settings, typically terminating a pre-set function. The apparatus may be placed in a pause mode or resumed, or the user selected pre-programmed function may also be paused and/or resumed.

After recording a user input it is determined whether or not the custom record has completed 2130. By way of example, custom record may be completed by: completion of a predetermined time period (for example at 6 minutes of operating time being recorded), or user selection of a record completion (for example, by re-selecting the record sector or selecting a save selector on the user interface).

After the custom record has completed the processor module then saves a custom sequence 2140, indicative of the recorded user input sequence, for later playback.

In an embodiment, by way of example only, a method performed by a processor module 2100 of providing a custom record feature in an apparatus (for example a kitchen appliance or a blender appliance), the appliance being coupled to a non-volatile storage medium for storing a custom sequence for later playback, the method comprising the steps of:

STEP 2110: enter a record mode;
STEP 2120: monitoring a user interface, and recording data indicative of the user inputs to form a recorded user input sequence;
STEP 2130: monitoring completion of the record mode;
STEP 2140: saving a custom sequence to the non-volatile storage medium, the custom sequence being indicative of the recorded user input sequence.

In an embodiment, STEP 2120 can further include recording data indicative of the user input of a speed or power selection element. The data recorded may be in the form of a time sampled sequence of a user input speed or power selection element (using constant time sample periods or using variable time sample periods). Alternatively, data recorded may be in the form of changes in a user input selection element, for example by way of recording a speed or power value and duration.

In an embodiment, STEP 2120 can further include recording data indicative of the user input of a pause selector. If a user selects the pause selector, data recorded may be in the form indicating a pause selection in the sequence of user inputs.

In an embodiment, STEP 2120 can further include recording data indicative of the user input of a pre-set function selected from one or more pre-set functions. When a user selects a pre-set function, the data recorded may be in the form of a record indicative of the pre-set function in the sequence of user inputs and the duration that the user operated the pre-set function (for example when interrupted or terminated or completed). If the pre-set function is paused and resumed, the data recorded may be in the form of a record indicating the pre-set function, flagged as a resumption, and the subsequent resumed duration that the user operated the pre-set function.

In use, an embodiment appliance can operate in record mode as follows:
(a) a user presses the a custom button selection (e.g. hold down 3 seconds), wherein the processor recognizes the input and duration to commence the record mode;
(b) the display element (e.g. LCD) can indicate the apparatus is in custom record mode (e.g. present and/or flashing the word custom), and also presenting a countdown timer (e.g. 6 minutes record countdown) for indicating the amount of recording time available;
(c) the user provides a first input to the user interface, causing the countdown timer to begin a count down indicating the time remaining and/or used;
(d) once the user has completed recording (for example, using all the available record time, pressing a custom record selector, or other record/save selection), the user can confirm storage of the custom sequence or cancel to stop without saving a custom sequence;
(e) if the user completes the maximum record period, the processor can prompt user to save a custom sequence (e.g. flash the custom record selection or button) or cancel without saving a custom sequence (e.g. flash a 'cancel' button);
(f) if the user terminates the record mode prior to completing the maximum record period (e.g. selecting the custom record selector/button)—user presses the custom selector causing the processor to identify empty memory slot for saving the record sequence as a custom sequence to non-volatile storage, with the display presenting the memory slot;

(g) An audible indicator/beep may be sounded to confirm the saving of the custom sequence, and completion of the record mode—by default the applicant can return to a 'standby' state.

Figure 41:
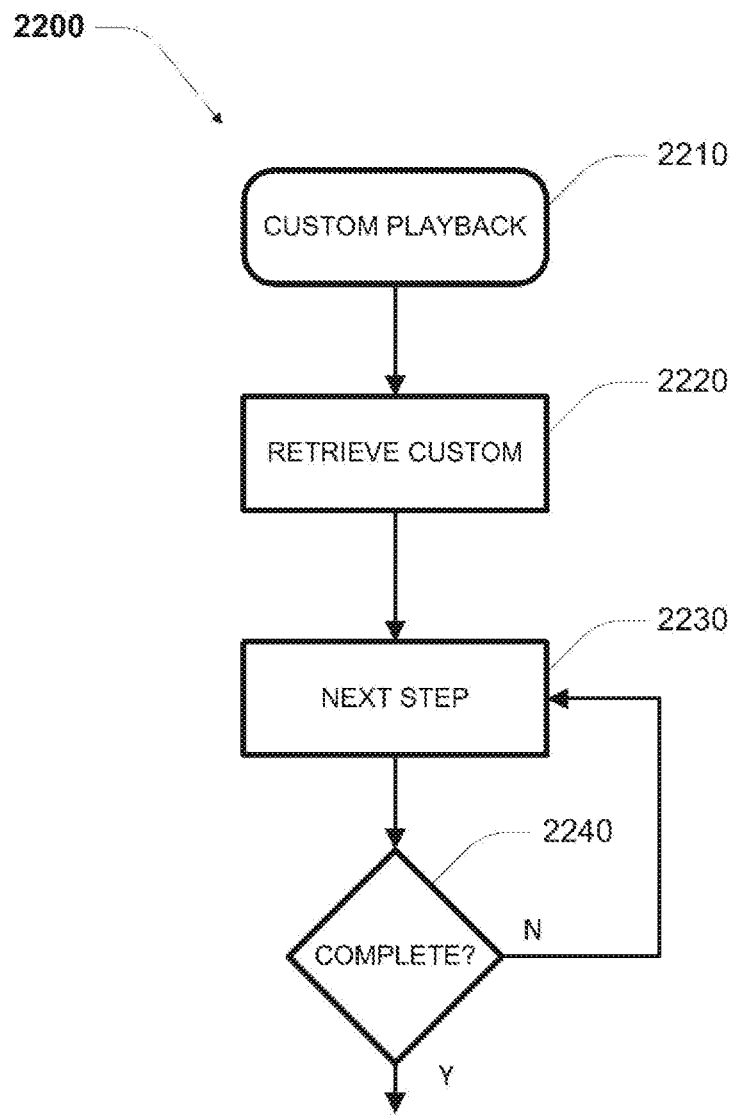
FIG. 41 shows a flowchart of an embodiment method of for playback of a custom operating sequence of an appliance.

FIG. 41 shows an embodiment method 2200 performed by a processor module for playback of a custom recorded sequence. This method 2200 commences with user selection of the custom sequence for playback 2210. The processor module then retrieves or reads 2220, from a non-volatile storage, the custom sequence, and commences processing of the first custom sequence step 2230. After each step has completed, or upon user input to terminate a sequence, the processor determines whether or not the custom sequence has been completed or terminated 22400. If the custom sequence has not been completed or terminated, the processor proceeds to commence the next step in the sequence. It would be appreciated that, the user interface display element can be used to present status of the current step (for example when a pause has been initiated through the custom sequence, requiring the user to resume the playback).

It will be appreciated that a pause button may be used during the playback of a custom sequence to temporarily halt the custom sequence. This live pause operates in addition to any recorded pause sequence step incorporated in the recorded custom sequence.

In an embodiment, by way of example only, a method 2200 performed by a processor module for playback of a custom recorded sequence includes the steps of:

STEP 2210: entering playback mode by user selection of a custom sequence;

STEP 2220: accessing the custom sequence from non-volatile memory;

STEP 2230: obtaining data indicative of the next step of the custom sequence, and commencing the next step;

STEP: 2240 monitoring completion or termination of the custom sequence, and if not complete or terminated, proceed to STEP 2230.

In use, an embodiment appliance can operate in playback mode as follows:

(a) a user selects a custom selector/button for a set time (e.g, 1 second), the processor enters a playback mode;

(b) the processor identifies custom sequences previously saved in non-volatile storage;

(c) if there are custom sequences saved, the display presents available sequences (for example, as C1 to C6), the user can use the manual speed/power selector (now configured as a program select dial) to move/select between the custom programs (e.g. selecting one of C1 to C6 as limited to custom save sequences), the user selects a specific custom sequence and commences playback of the custom sequence (e.g. selecting/pressing 'start' or 'play' symbol);

(d) if there are no programs saved, the display element indicates that no programs are available.

Figure 42:
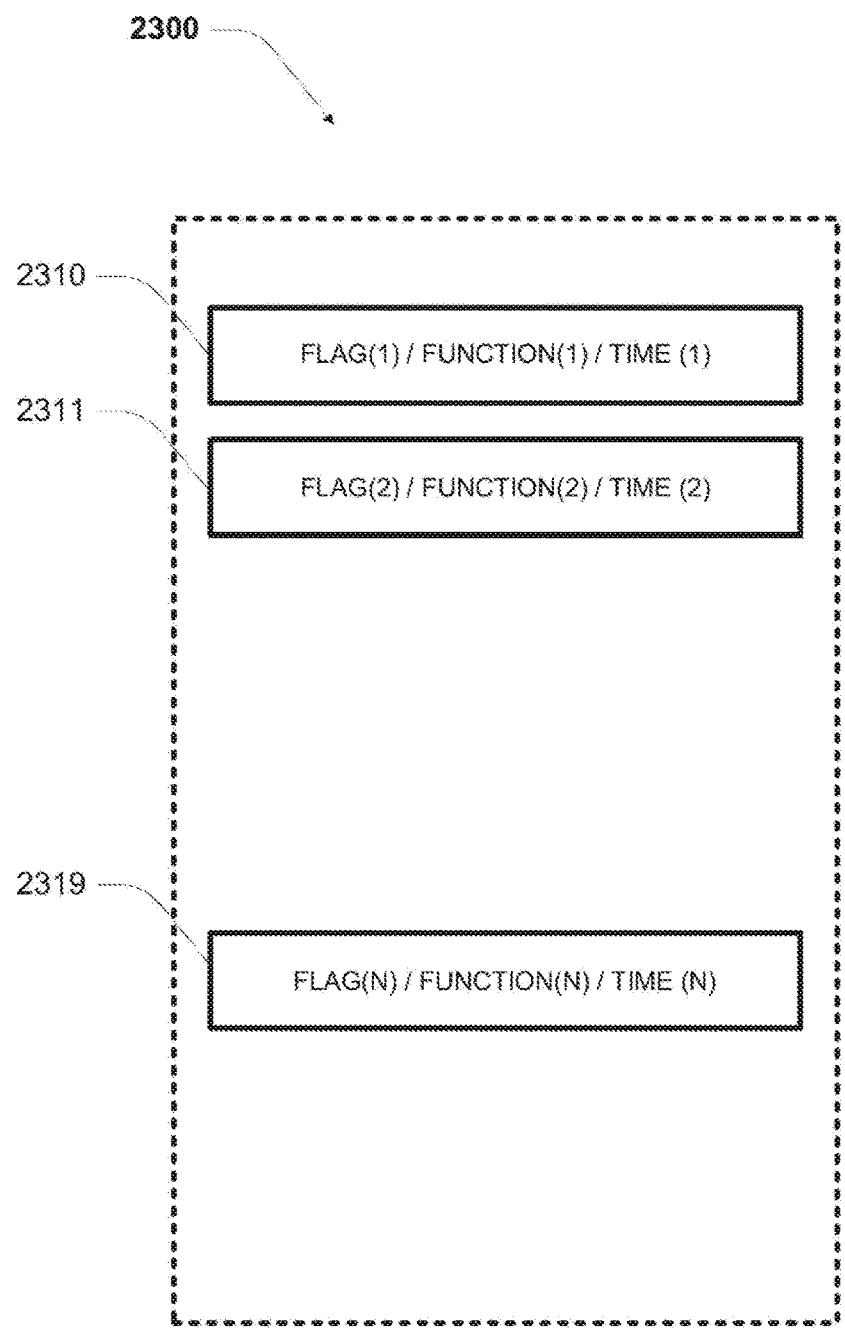
FIG. 42 shows a data diagram of an embodiment data structure used in recording and playback of a custom operating sequence of an appliance.

FIG. 42 shows an embodiment data record indicative of a recorded custom sequence 2300. The data record includes data indicative of each of a plurality of sequence steps 2310. Each sequence step may include data indicative of a flag, function (or speed/power) and time (or duration).

It would be appreciated that, as a pre-set function (for example, as disclosed herein) may typically includes event driven features (not merely a speed-time or power-time sequence), the custom sequence can include selected function calls and the duration for that call. A function may be paused and resumed, or paused and restarted. Accordingly, data of a sequence step may include a flag indicative of: a function start, or a function resume. Data of a sequence step may further include a time value indicative of: an initial duration of the function or a resumed duration of the function. During playback, the function would be interrupted at the predetermined time to commence the next step. It will be appreciated that the next step may be indicative of: a different function call, a manual motor speed or power setting, or a pause selection. A flag would typically be used in interpreting the next step record. It would be appreciated that the terminating step can have a flag indicative of termination.

The playback of a function selection or a manual speed or power selection may also be live paused. This halts any time remaining for any particular steps.

By way of example only, recording of a manual speed or power setting sequence can be performed by uniform discreet time sampling of the input selector at discrete intervals, whether further quantised to a lower number of ranges. By way of example only, recording of a manual speed or power setting sequence can be performed by event based recording of the speed or power selector—whereby the speed or power selected is recorded, whether further quantised to a lower number of ranges, with the duration that that setting was maintained.

It will be appreciated that this form of recording sequence steps enables forming of a custom sequence that can playback a mixture of both function calls and also record manual speed or power sequences.

Interpretation

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the technology.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A motorized kitchen apparatus including blades, the motorized kitchen apparatus comprising:
   a user interface coupled to a processor module, the user interface enabling user selection of a first motor speed setting;
   a motor controller coupled to a motor, the processor module coupled to the motor controller for controlling operation of the motor according to user input selections;
   one or more sensors coupled to the processor module, the processor module being adapted to receive a feedback signal indicative of operating parameters associated with the motor;
   wherein, upon receiving a user selection of the first motor speed setting, the processor module controls the motor using the motor controller to provide a sequence of pulses, each pulse in the sequence bringing the motor to the user selected first motor speed setting;
   wherein once the user selected first motor speed setting is reached, the processor module disables power to the motor; and
   wherein, when power to the motor is disabled, the processor module monitors a speed of the blades using the feedback signal to identify when a first predetermined motor speed is reached, and then after a wait time period, controls the motor using the motor controller to bring the motor to the first motor speed setting; and
   wherein the processor module calculates the wait time period based on a time between when power to the motor is disabled and the motor reaches the first predetermined second motor speed.

2. The apparatus according to claim 1, wherein the wait time period is an estimated time for the motor speed to reach a second predetermined motor speed after power to the motor is disabled, wherein the second predetermined motor speed is lower than the first motor speed setting.

3. The apparatus according to claim 1, wherein the wait time period is an estimated time for the motor speed to reach substantially zero after power to the motor is disabled.

4. The apparatus according to claim 1, wherein the processor module controls the motor using the motor controller to provide a soft start profile until the user selected first motor speed setting is reached.

5. The apparatus according to claim 1, wherein the processor module controls the motor using the motor controller to provide a second sequence of pulses, each pulse in the second sequence bringing the motor to a second motor speed setting, wherein the second motor speed setting is different from the first motor speed setting.

6. The apparatus according to claim 5, wherein the processor module uses the motor controller to bring the motor to the first motor speed setting for a first predetermined period of time, wherein the processor module uses the motor controller to bring the motor to the second motor speed setting for a second predetermined period of time, and wherein the first predetermined period of time and the second predetermined period of time do not overlap.

7. The apparatus according to claim 1, wherein the operating parameters associated with the motor include any one or more of: motor rotational speed, motor torque, or power applied to the motor.

8. The apparatus according to claim 1, wherein the processor module is coupled to a hall effect sensor located proximal to a shaft of the motor, such that the hall effect sensor provides a signal indicative of motor rotational speed.

* * * * *